US005798786A

United States Patent [19]

Lareau et al.

[11] Patent Number: 5,798,786
[45] Date of Patent: Aug. 25, 1998

[54] ELECTRO-OPTICAL IMAGING DETECTOR ARRAY FOR A MOVING VEHICLE WHICH INCLUDES TWO AXIS IMAGE MOTION COMPENSATION AND TRANSFERS PIXELS IN ROW DIRECTIONS AND COLUMN DIRECTIONS

[75] Inventors: Andre G. Lareau, Bloomingdale; Brian James, Buffalo Grove; William R. Pfister, Schaumburg; Kenneth J. Jerkatis, Barrington; Stephen R. Beran, Mount Prospect; Russell A. Bennett, McHenry, all of Ill.

[73] Assignee: Recon/Optical, Inc., Barrington, Ill.

[21] Appl. No.: 646,509

[22] Filed: May 7, 1996

[51] Int. Cl.$^6$ .............................. H04N 7/18; H04N 9/47; H04N 5/228
[52] U.S. Cl. ........................ 348/144; 348/145; 348/208
[58] Field of Search ........................ 250/330–334, 250/332, 370.08, 318; 235/447; 348/164, 143, 144, 145, 154, 155, 208, 317, 320

[56] References Cited

U.S. PATENT DOCUMENTS

| | | | |
|---|---|---|---|
| 4,157,218 | 6/1979 | Gordon . | |
| 4,505,559 | 3/1985 | Prinz . | |
| 4,654,876 | 3/1987 | Atkins | 382/54 |
| 4,709,381 | 11/1987 | Beaudet | 377/62 |
| 4,747,155 | 5/1988 | Dotson . | |
| 4,908,705 | 3/1990 | Wight . | |
| 4,959,725 | 9/1990 | Mandle | 358/222 |
| 5,155,597 | 10/1992 | Lareau . | |
| 5,231,502 | 7/1993 | Pfister | 358/213.11 |
| 5,278,660 | 1/1994 | Sugiki | 358/213.22 |
| 5,412,422 | 5/1995 | Yamada et al. | 348/218 |
| 5,486,859 | 1/1996 | Matsuda . | |
| 5,526,045 | 6/1996 | Oshima et al. | 348/208 |
| 5,668,593 | 9/1997 | Lareau et al. | 348/146 |
| 5,692,062 | 11/1997 | Lareau et al. | 382/107 |

OTHER PUBLICATIONS

D. Kawachi, *Image Motion Due to Camera Rotation*, Photogrammetric Engineering vol. 31 (5) pp. 861–867 (1965).
D. Light, *Film Cameras or Digital Sensor? The Challenge Ahead for Aerial Imaging*, Photogrammetric Engineering & Remote Sensing, vol. 65 (3) pp. 285–291, Mar. 1996.
R. Ruck, *Design Versatility of the Prism Pnoramic Camera*; The KS–116 and KA–95 cameras, vol. 309, SPIE Proceedings, paper 909–10, p. 65 (Aug. 27–28, 1981).

*Primary Examiner*—Tommy P. Chin
*Assistant Examiner*—David R. Vincent
*Attorney, Agent, or Firm*—McDonnell Boehnen Hulbert & Berghoff

[57] ABSTRACT

An electro-optical imaging array having pixels arranged in rows and columns electronically compensates for image motion in the plane of the array regardless of whether the motion vector is in the row direction, the column direction, or in a diagonal direction, i.e., in some vector combination of row and column directions. In an aerial reconnaissance application, the image motion may be due to rotation of the aircraft about roll, pitch and/or yaw angles in addition to forward velocity of the aircraft. The image motion compensation is achieved with no moving parts and does not require a stabilized platform.

A camera control computer determines the magnitude and direction of the image motion from inertial navigation system inputs, including velocity, flight, and aircraft rotation information, and calculates pixel information transfer rates in the row and column directions. The pixel information transfer rates are supplied to a counter and clock driver circuit for the array. The pixel information in the array is transferred in the row and column direction in a step-wise fashion in the row and column directions at a rate and direction substantially matching the image motion. The array itself is provided with a gate and control line design to enable charge representing pixel information to be transferred in both the row and column directions.

28 Claims, 16 Drawing Sheets

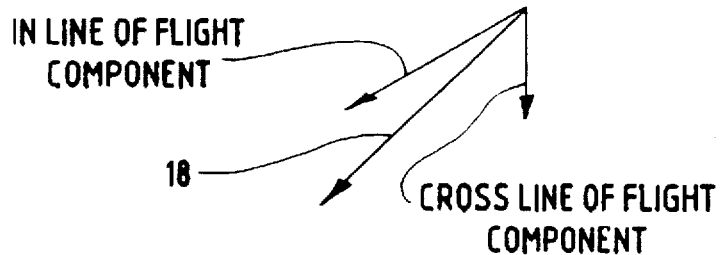
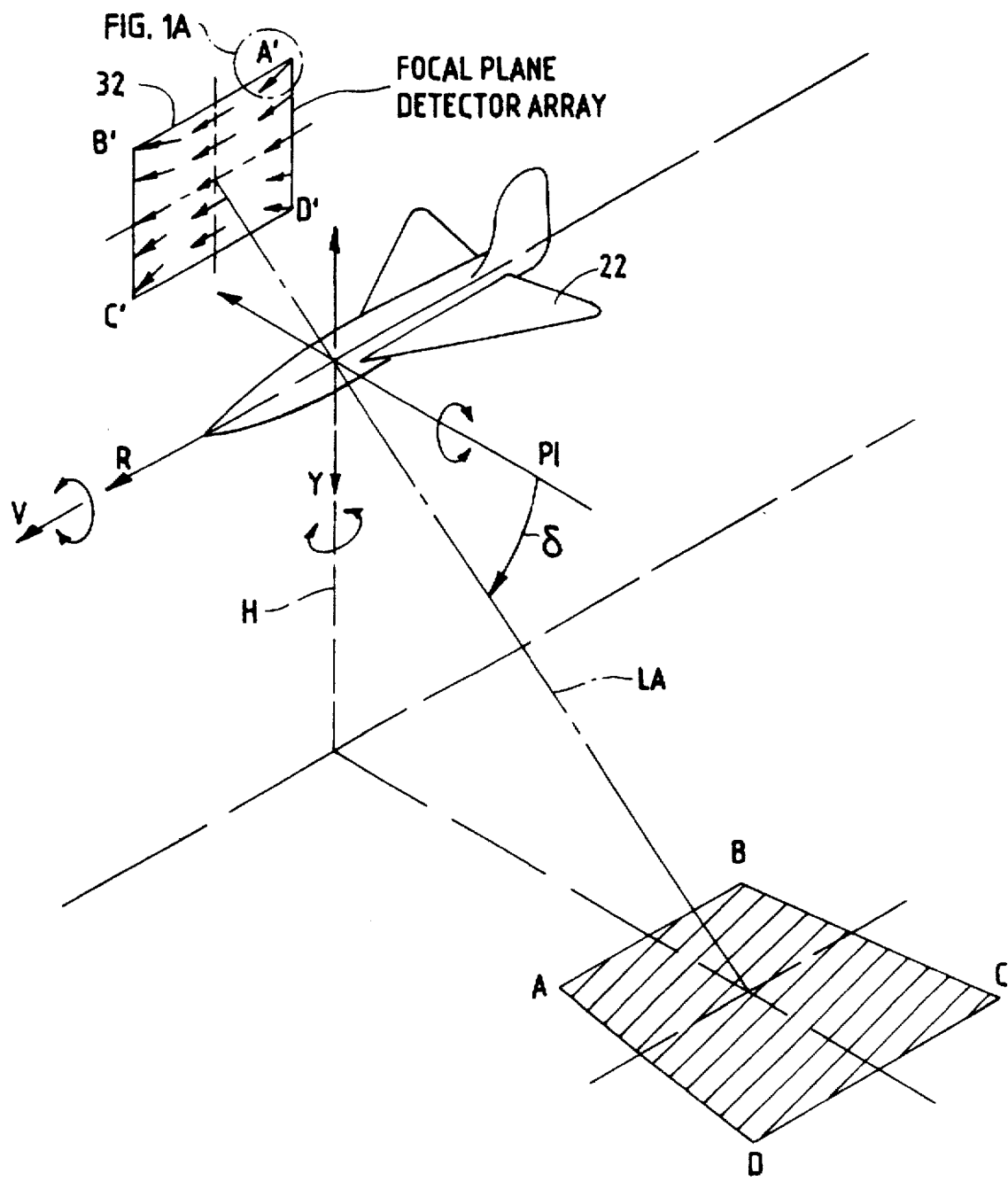

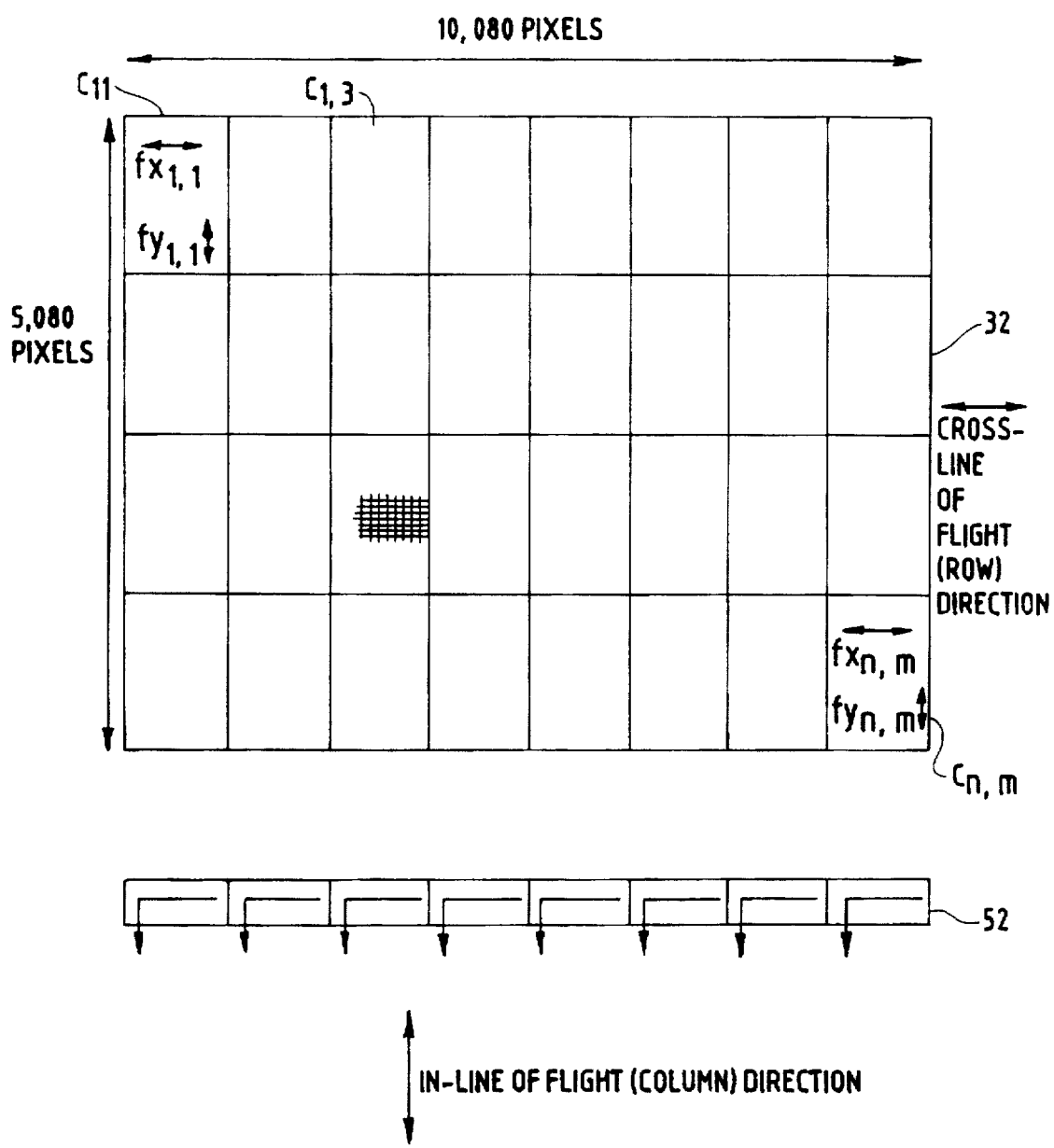

ROLL ONLY

PITCH ONLY

FIG. 6C  YAW ONLY
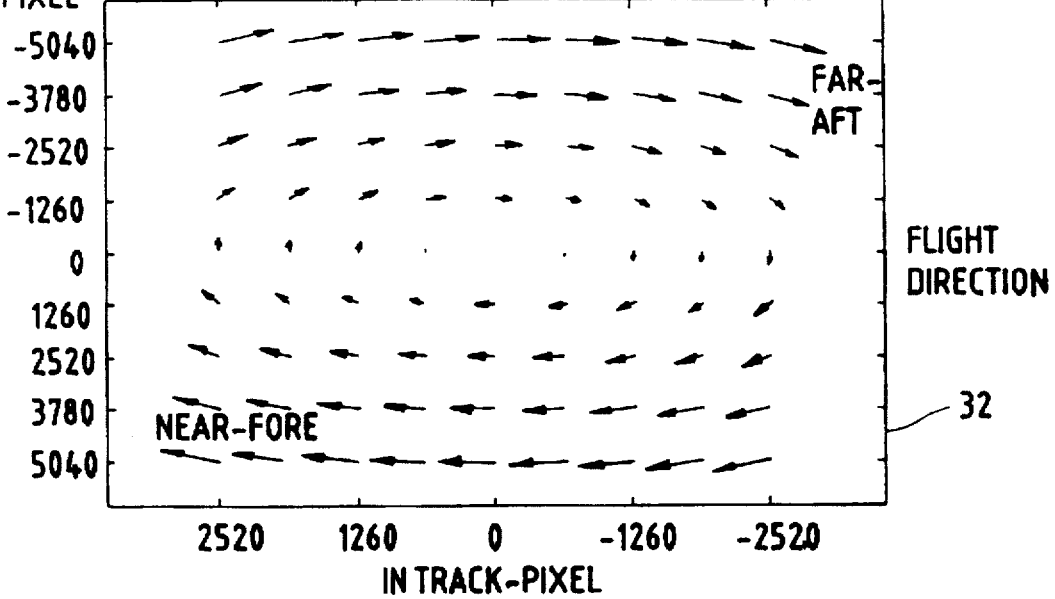
FIG. 6D  ROLL, PITCH AND YAW
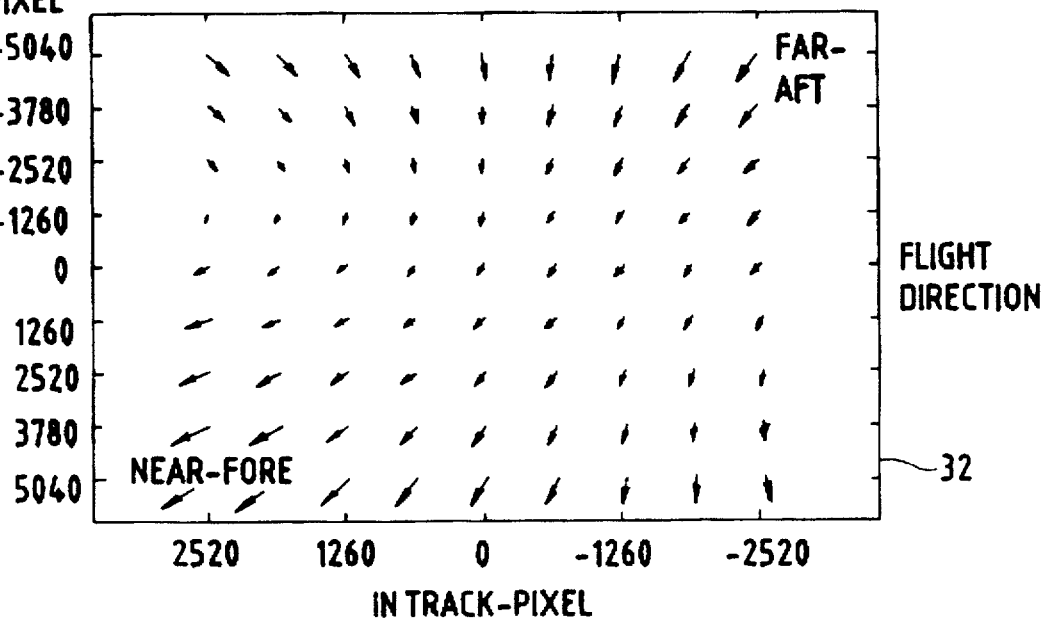

ROLL, PITCH, YAW AND PLATFORM VELOCITY

ERROR IN APPROXIMATE DISPARITY

ERROR IN GRADED FMC DISPARITY

ROLL, PITCH, YAW AND PLATFORM VELOCITY

ERROR IN APPROXIMATE DISPARITY

ERROR IN GRADED FMC DISPARITY

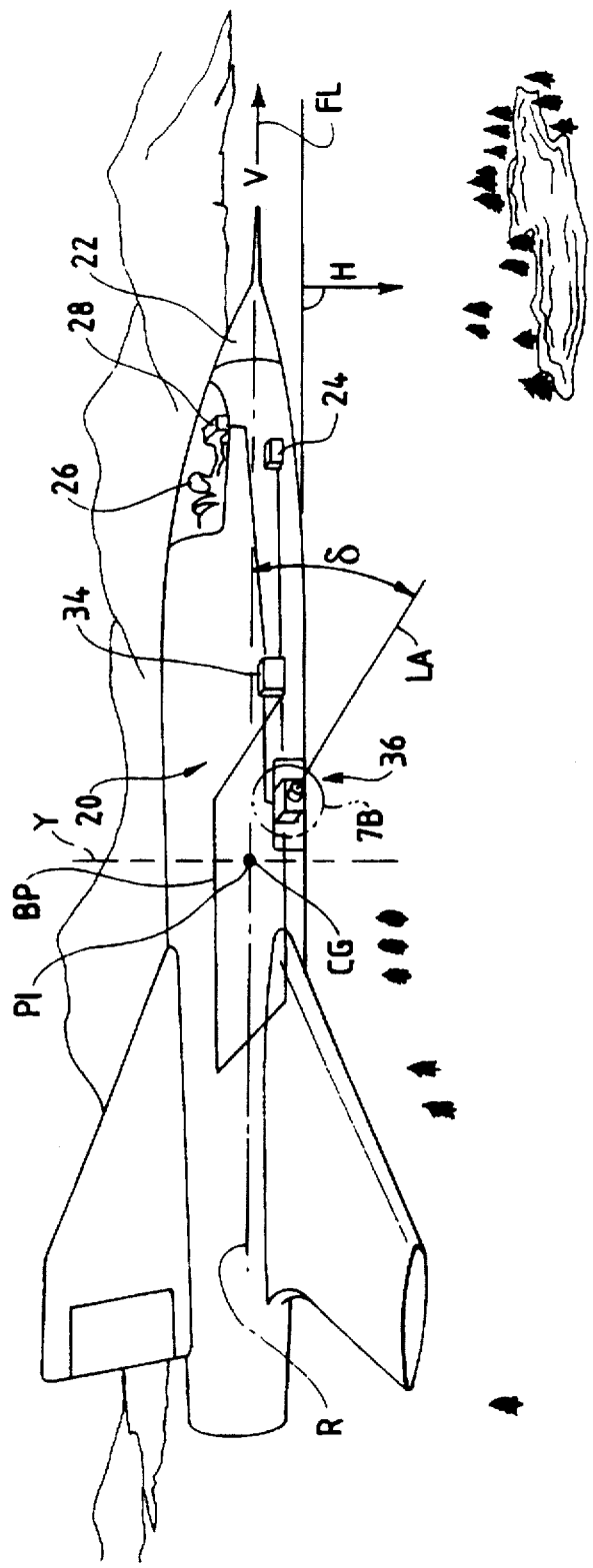
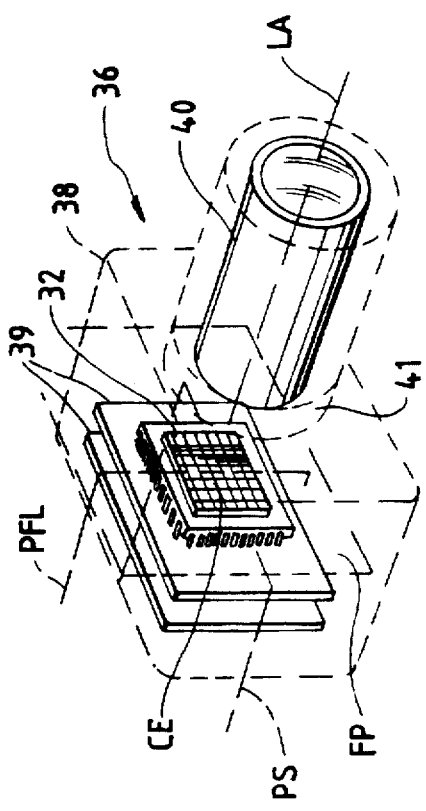
FIG. 7A
FIG. 7B

ELECTRO-OPTICAL IMAGING DETECTOR ARRAY FOR A MOVING VEHICLE WHICH INCLUDES TWO AXIS IMAGE MOTION COMPENSATION AND TRANSFERS PIXELS IN ROW DIRECTIONS AND COLUMN DIRECTIONS

BACKGROUND OF THE INVENTION

A. Field of the Invention

This invention relates generally to optical systems which generate an image of a scene and which compensate for relative motion of the image with respect to the system, such as found in imaging systems used in aerial reconnaissance photography. More particularly, the invention relates to a system which electronically compensates for the relative motion of the image of a scene in any arbitrary direction with respect to an electro-optical imaging array.

The array is suitable for carriage in a reconnaissance vehicle. In such an embodiment, the invention electronically compensates for image motion that has components due to the forward velocity of the vehicle carrying the imaging array, as well as image motion components due to rotation or disturbances of the vehicle about roll, pitch and/or yaw axes during the exposure of the array to the scene, thus yielding crisp, clear images from the array.

B. Background Art

Most people who have attempted to photograph a rapidly moving object at close range with a simple box camera have found that the film image of the object is blurred or smeared due to the relative motion of the image over the film. The same effect is observed if the camera is moved during exposure of a stationary scene. If light conditions permit very short exposure times, the image essentially can be "stopped" by increasing shutter speed, and the smearing can be minimized.

Reconnaissance cameras frequently are required to record images in light conditions that prevent sufficiently short exposure times to eliminate image smearing by increases in shutter speed alone. Typically, such cameras are carried by aircraft for recording terrain scenes. Imaging systems used in such cameras comprise not only film, but also electro-optical devices, including charge-coupled devices. In any such camera in which relative motion exists between a scene to be imaged and the imaging system, the recorded image of the scene will be smeared unless some technique is used to compensate for the relative motion. Such techniques commonly are known as "forward motion compensation" or "image motion compensation." Left uncompensated, the smearing and image degradation resulting from the relative motion reduces the information content of the recorded image.

When a camera is aimed vertically at a scene of interest directly below an aircraft, the rates of motion of all points of the scene image in the field of view are nearly the same, and the motion can be compensated to avoid smear relatively easily. For example, if the imaging system is film, smear is avoided by moving the film emulsion at the same rate and in the same direction as the motion of the scene image in the focal plane of the camera. However, if, during the time in which the camera is exposed to the scene, the aircraft is undergoing rotation (e.g., in roll, pitch and/or yaw) or is subject to rotational disturbances, the image motion no longer is simply in the line of flight, but rather is in a direction at an angle having components in both the line of flight and cross-line of flight directions. The image motion rate and direction is also not constant for the array, i.e., it varies from location to location over the array.

When the scene of interest is not directly below the aircraft, but rather is perpendicular to the direction of flight and at a side oblique angle, the solution to the problem of image motion compensation when aircraft rotation occurs becomes extremely complex and difficult. Objects at a closer distance to the aircraft appear to be moving faster relative to the aircraft than objects farther away. Rotation of the aircraft introduces image motion having vector components in the cross- and in-line of flight directions. Moreover, the image motion rates vary from location to location across the array. The image motion vectors depend on the magnitude of the rotations, and their components in roll, pitch and yaw, and still other parameters, such as the velocity of the aircraft and the height above ground.

The specifics of the problem are also complex because changes in the aircraft velocity, aircraft rotation, height above ground, and camera depression angle below horizontal occur during a reconnaissance mission. These changes affect the rate of image motion in the focal plane of the camera, and they must be taken into account by a forward motion compensation system.

A solution to the image motion compensation problem that compensates for image motion due to forward velocity of the aircraft, and rotation of the aircraft, is believed to be unknown in the art. In the past, the aircraft typically maintains a steady course (with roll, pitch and yaw motion reduced as much as possible) in order to preserve image resolution. Installing the camera on a stabilized platform is one mechanical solution, but leaves something to be desired. An electronic solution to image motion compensation, suitable for an electro-optical imaging array, which provides for image motion compensation when the image motion has vector components in the line of flight and cross-line of flight direction has heretofore completely eluded the art.

For aerial reconnaissance, electro-optical cameras, particularly those of the charge-coupled device variety, are perceived as superior to film cameras to an increasing extent. In an electro-optical camera, radiation from an image of interest impinges on a solid state device typically having (at least) several thousand picture elements or pixels. The incident radiation is converted into charge packets (pixel information) at the photosites (pixel elements) and collected in potential wells. The charge packets contain scene information, and upon being transferred out of the device, are converted into electrical signals. One primary advantage of an electro-optical imaging camera is that the scene information can be almost instantaneously recovered from a reconnaissance aircraft to an earth-based station, or can be converted to a video image. Since charge-coupled device imaging cameras have very small pixels closely spaced together, the resolution of a resulting image tends to be very high. Electro-optical imaging cameras can also be made sensitive to particular frequencies of incident radiation. Background information on charge-coupled devices can be found in standard texts such as D. Schroder, *Modular Series On Solid State Devices*, Ch. 3, 4, Addison-Wesley (1987), and in C. Sequin and M. Tompsett, *Charge Transfer Devices*, Bell Telephone Laboratories, Academic Press (1975), and in S. M. Sze, *Physics of Semiconductor Devices*, Ch. 7, John Wiley & Sons, Inc. (1981).

To reduce the time needed to image a scene of interest and thus reduce the time of exposure to hostile threats, a preferred mode of the present invention uses a two-dimensional electro-optical imaging area array, rather than a linear (one-dimensional) array. An area array can image an entire scene instantaneously, rather than a line at a time. Until recently, only relatively small electro-optical imaging arrays have been commercially available, such as those typically used in television cameras. However, larger, high pixel count area arrays suitable for aerial reconnaissance sensors are now feasible. Information useful for designing high pixel count area arrays also is found in J. Janesick, *Multi-Pinned-Phase Charge-Coupled Device*, NASA Tech. Brief Vol. 14, No. 8, Item No. 115, p. 22, Jet Propulsion Laboratory, August, 1990.

A two-dimensional area array type detector array can convert an entire image of a scene into a complete frame of pixel information during a short exposure period. After the exposure period, a shutter can be used to prevent continued exposure while the pixel information in the array is read-out to a signal processing unit. After the read-out is completed, the array is ready for the next frame exposure. If the frame read-out time is short (say, less than a second), then consecutive frames can be taken in sub-second intervals in order to obtain large scene coverage in short periods of time. By providing motion compensation in an area detector having exposure time controlled by a shutter, the present invention substantially reduces exposure of an aircraft, a pilot and a detector array to enemy countermeasures.

In a linear electro-optical focal plane reconnaissance detector, such as the linear detector of the Wight patent U.S. Pat. No. 4,908,705, a scene of interest is scanned a line at a time across an array in a direction perpendicular to the array length. Because the means of scanning is provided by the aircraft forward motion, the aircraft must maintain a steady, well defined flight path while the scene is being recorded. Depending on the size of the scene, the recording time for any one target may range between 10 and 20 seconds, or even longer. In a military situation in which the reconnaissance aircraft may be subject to enemy threats, the vulnerability during the recording time may be excessive. Moreover, the linear detector of the Wight patent has no capability of compensating for image motion having a cross-line of flight component, such as is present when the aircraft undergoes rotational disturbances.

Mechanically-based forward motion compensation schemes have been devised and implemented in an attempt to eliminate image smear due to forward motion, or to reduce such smear to acceptable levels. Such schemes have been implemented by use of a translating film, a translating lens, or a rotating mirror. Such systems are generally incapable of the complex movements that would be required to compensate for image motion resulting from forward velocity of the vehicle and rotations experienced by the aircraft during exposure of the array to the scene.

In the translating film technique, the film is moved in the same direction and velocity as a portion of an image. The image motion velocity and the film velocity are made essentially synchronous and relative motion between them during the exposure time period essentially is eliminated. The net result is that the image portion is essentially stationary with respect to the film during the exposure time period. The translating film technique is frequently used on short and medium focal length framing type cameras.

In the translating lens technique, if a lens is translated in space, the image of distant objects will translate with the lens in a one-to-one relationship in the same direction. Therefore, if the lens in an aerial reconnaissance camera is translated at the proper velocity opposite to the direction of flight, the image velocity caused by the aircraft forward motion is canceled by the image velocity due to the moving lens. The net result is that the image is essentially stationary relative to the film, and therefore no essential motion smearing is occurring during the exposure. This type of forward motion compensation is frequently used on short and medium focal length panoramic type scanning cameras. See, e.g., Ruck, *Design Versatility of the Prism Panoramic Camera: The KS-116 and KA-95 Cameras*, SPIE Proceedings, Vol. 309, paper 309-10, (Aug. 27-28, 1981).

In the rotating mirror technique, as the aircraft is flying in a given flight path, the objects in the scene have an apparent angular velocity relative to the camera. The apparent angular velocity is related to the aircraft velocity and the range to the target. If a camera is looking into a mirror at a nominal angle of 45°, the camera line of sight is deviated by a nominal 90° angle. If the mirror is rotated in the proper direction and at the proper rate during the exposure, the scene appears to have no motion relative to the camera. Therefore, at the film plane, the image is essentially stationary and forward motion image smear is substantially negated. The rotating mirror forward motion compensation concept is often used on long focal length frame and line scanning type cameras.

All three of the foregoing mechanical forward motion compensation schemes are employed in various aerial reconnaissance cameras, including film cameras and electro-optical line scanning cameras. A principal disadvantage of these forward motion compensation schemes is that they all involve mechanical devices and consequently add complexity, weight, and expense to the imaging system. As note above, such systems are generally incapable of the complex movements that would be required to compensate for image motion resulting from forward velocity of the vehicle and rotations experienced by the aircraft during exposure of the array to the scene, and would produce blurry images under these circumstances. Other methods and techniques of forward motion compensation also have been developed and are discussed in the Prinz patent, U.S. Pat. No. 4,505,559, the Gordon et al. patent, U.S. Pat. No. 4,157,218, and the Wight patent, U.S. Pat. No. 4,908,705.

The Lareau et al. patent, U.S. Pat. No. 5,155,597, assigned to the assignee of the present invention, discloses an electro-optical imaging array which accomplishes forward motion compensation electronically, and without moving parts. In the Lareau et al. patent, the imaging array is composed of photosensitive cells arranged in rows and columns. The columns are organized in column groups. Each column group is given its own pixel information transfer rate. Pixel information in each of the column groups is transferred through the array at a rate in synchronism with the image motion rate in each column group. In the Lareau et al. patent, the pixel information is transferred through the array in the column groups at a rate which closely approximates the actual image velocities.

The present invention represents a substantial advance from the image motion compensation techniques described in the above patents, and provides an electro-optical imaging array which specifically compensates for aircraft rotations and angular disturbances during the exposure period, all electronically and with no moving parts. Preferably, the array is subdivided into a number of cells of pixel elements, with pixel information transferred at the same rates in the row and column directions for all the pixels in the cell. In the invention, the image motion due to roll, pitch and/or yaw rotations and disturbances is determined, and resolved into two orthogonal components aligned with the row and column directions of the array. The combined image motion components due to the forward motion of the aircraft and aircraft rotations are resolved into pixel information transfer rates in the row and column directions for each of the cells in the array. Pixel information is transferred in the row and column directions in substantial synchronism with the image motion, thereby preserving resolution of an image produced by the array. Moreover, the present invention provides for control circuitry for the array that continually updates the pixel information transfer rates along in the row and column directions as aircraft disturbance and rotation, velocity, height and camera depression angle all change in real time, preserving image resolution during successive exposures of the array.

The motion compensation techniques of the present invention enables effective use of a detector array having a large number of photosites or pixel elements (e.g., four to six thousand or more in both the column and row directions of the array) that will image a large area of terrain in every frame. The present invention makes such arrays practical by preserving image resolution (i.e., scene detail information) in every frame of imagery, even where aircraft rotation and disturbances are present during the exposure period. The present invention also enables high array exposure sensitivity. That is, motion compensation is accomplished in a way that promotes long exposure time without blurring the image. In a push broom system, exposure time is limited by the line rate, which is dictated by the aircraft velocity to height ratio (V/H). For the present invention, the exposure time is not limited by the aircraft V/H ratio. This permits operation at lower scene illumination levels and extends the available time of day for light-sensitive sensor operation.

Additionally, the present invention provides for rapid read-out of collected scene information. A rapid read-out of the electrical signals of an array is necessary in order to achieve high frame rates. High frame rates are desirable to allow multiple images to be recorded in a short time such as required for stereo imagery.

The present invention is reliable and robust because it requires no mechanical scanning mechanism, no rotating mirrors and no translating lenses in order to achieve forward motion compensation, and image motion compensation even when aircraft disturbance and rotation effects are present. The image motion compensation is achieved electronically, with no moving parts.

Another feature of the invention is that it is suitable for use in a wide variety of applications, such as tactical reconnaissance, drug interdiction, low intensity conflict, low and medium altitude missions, and reconnaissance at low light levels.

SUMMARY OF THE INVENTION

These and other objects, advantages, and features of the invention can be achieved in an imaging array with two axis image motion compensation, comprising an array of pixel elements arranged in rows and columns, with the rows defining a row direction and the columns defining a column direction. The pixel elements store pixel information representing an image of a scene. When the array is exposed to the scene, the image has a motion with respect to the array of pixel elements. The imaging array has associated with it a means for transferring the pixel information in the array in two axes, that is, in the row direction and in the column direction, in substantial synchronism with the motion of the image, whereby the resolution of an image generated by the array may be preserved.

Preferably, the array of cells is organized into a grid comprising a plurality of cells of pixel elements. The pixel information in the cells is transferred uniformly in the row direction and in the column direction for each of the pixel elements in the cell. The number of cells in the array will vary depending on cost-to-performance tradeoffs and the size of the array, but will typically be between 30 and perhaps several hundred.

The imaging array in a preferred embodiment comprises a charge-coupled device, in which the pixel elements are a photosensitive material that converts incident radiation into electrical charge. This type of device can be fabricated with gate and control lines that permit charge representing scene information to be transferred in the row and column directions from one pixel to the next. Other types of electro-optic imagers could be used as well.

In a reconnaissance application for the invention, the array is installed in an airborne vehicle, with the vehicle having an inertial navigation system or equivalent system generating information as to roll, pitch and yaw of the vehicle, and possibly roll, pitch and yaw rates. In order to determine the proper charge transfer rates for the array, the means for transferring comprises a computer having a calculating means responsive to the inertial navigation system for calculating a rotation matrix for the rotation of the vehicle and for calculating an image disparity vector for the pixels from the rotation matrix, and a line rate calculation means responsive to the calculating means for determining pixel information transfer rates for the cells in the array in the row direction and in the column direction. The pixel information in the array is transferred in the row direction and the column direction according to the pixel information transfer rates to thereby compensate for the image motion. In this manner, image motion due to forward motion of the aircraft and image motion due to rotational motion of the aircraft is electronically compensated, yielding crisp images from the array.

BRIEF DESCRIPTION OF THE DRAWINGS

The preferred embodiment of the present invention will be described in conjunction with the accompanying drawings, in which:

FIG. 1 is a perspective view of an aircraft carrying the imaging array of the present invention, showing the image motion in the array having components in the in-line of flight direction and the cross-line of flight direction due to aircraft forward motion and aircraft disturbances or rotation about the roll, pitch and/or yaw axes;

FIG. 4 is a schematic drawing of the imaging array of FIG. 2 showing the arrangement of the array in a plurality of cells, each cell comprising pixels arranged in rows and columns, with the transfer of pixel information in each cell at different predetermined and adjustable transfer rates to compensate for the in-line of flight and cross-line of flight components of image motion;

FIG. 6C is an illustration of an example of the image motion in the cells of an array due to yaw motion only;

FIG. 6D is an illustration of the image motion in the cells of the array due to the combined effects of roll, pitch and yaw motion from FIGS. 6A–6C;

FIG. 7A is a simplified schematic drawing of an airborne reconnaissance system utilizing an electro-optical camera assembly made according to a preferred form of the present invention and showing the interrelationship between the system components;

FIG. 7B is an enlarged, fragmentary perspective drawing of the camera assembly of FIG. 7A showing the relationship between various components, including an electro-optical imaging array;

DETAILED DESCRIPTION OF THE
PREFERRED EMBODIMENT OF THE
INVENTION

I. Overview

Referring now to FIG. 1, a reconnaissance aircraft 22 carrying an imaging array 32 in accordance with the present invention is shown flying past a scene bounded by the points A, B, C and D. The array is composed of a plurality of pixel elements arranged in row and columns that store scene information in the form of electric charge, which is transferrable from one pixel element to another. The array 32 is shown displaced from the aircraft and greatly enlarged in order to illustrate an example of the image motion that occurs in the plane of the array 32. Points A, B, C and D forming the boundary of the scene are imaged at the four corners of the array at points A', B', C' and D'. The aircraft has a forward velocity V and a height above ground H. The reconnaissance system in the aircraft includes a lens with a lens axis LA oriented at a camera depression angle $\delta$ below horizontal.

During the exposure period, image motion occurs in the array that is due to forward motion of the aircraft, and due to rotations or disturbances about the roll, pitch and/or yaw axes R, Pl, Y respectively. The combined effects of this image motion at various locations in the array is illustrated by the vectors or arrow in the array. The length of the vector is indicative of the magnitude of the image motion, and the direction of the arrow is indicative of the direction of the image motion. Note that magnitude and direction are different for different portions of the array. As shown in the enlargement of one of the arrows, the image motion vector 18 can be resolved into two components: one in the line of flight direction (the direction between A'B' in the array) and a component in the cross-line of flight direction (in the direction B'C'). The in-line of flight direction is in the same direction as the columns of the pixel elements of the array, and the cross-line of flight direction is the same direction as the rows of the pixel elements of the array.

Figure 2:
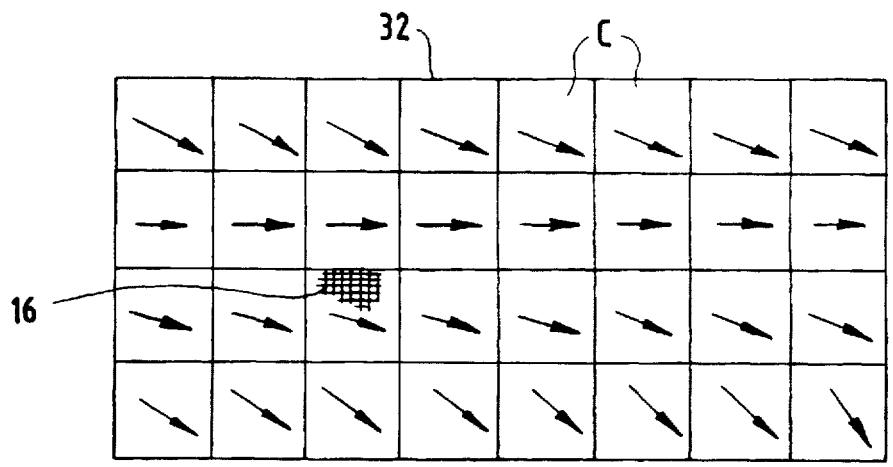
FIG. 2 is a schematic diagram of the array of FIG. 1, showing the array subdivided into a plurality of cells, with the image motion in each cell having components in the in-line of flight (column) and cross-line of flight (row) directions.

Referring to FIG. 2, the array of FIG. 1 is shown schematically. The array 32 is organized into a plurality of cells C in order to tailor the charge motion in the array to the image motion occurring in different regions of the array. Each cell comprises a portion of the array 32 comprising a large number of individual pixel elements, which are arranged in rows and columns. The image motion vectors typically vary from location to location over the entire array due the effects of rotation about roll, pitch and/or yaw. Ideally, to compensate for the image motion, the array should have image motion compensation that matches the image motion in every location in the array. As a tradeoff of cost to performance, it is preferred to subdivide the array into a manageable number of cells C, for example 32, 64 or 256, and transfer pixel information in the pixels of each cell in unison at a rate that corresponds to the particular image motion for that cell. Preferably there are at least 20 cells, and a number between 30 and around 500 a should be a suitable number of cells for most implementations. The particular image motion for the cell can be either an average image motion for several locations in the cell, or the image motion calculated at the center of the cell.

Figure 3:
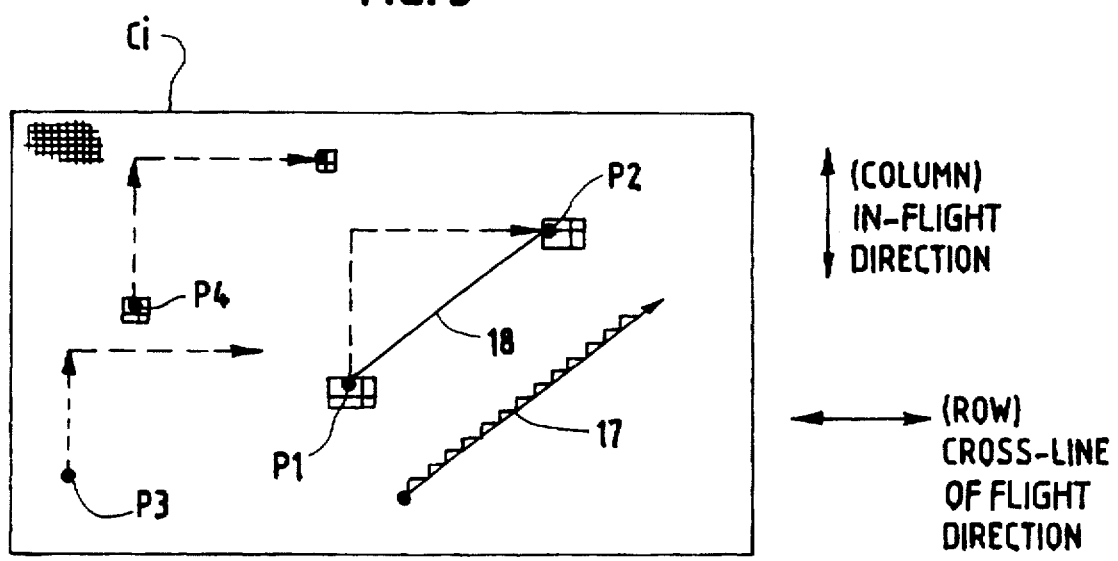
FIG. 3 is detailed illustration of one of the cells of FIG. 2, showing the image motion vector having components in the row and column directions, with the pixel information in each of the pixels in the cell transferred in the row and column directions in a manner to substantially match the image motion, thereby preventing smearing of the image.

Referring to FIG. 3, one arbitrary cell Ci of FIG. 2 is shown isolated, showing a representative image motion vector 18. The image motion is resolved into two components, an in-line of flight direction corresponding to the "column" direction and a cross-line of flight direction corresponding to the "row" direction. For example, a particular point in the image may move from pixel P1 to pixel P2 during the exposure period. Since the cell Ci is composed of perhaps several hundred pixel elements in the row direction, and several hundred pixel elements in the column direction, to compensate for image motion the charge (representing scene information) may be transferred stepwise upwards by a total of 30 pixels and over by a total 40 pixels during the exposure period. The same net pixel information transfer occurs for the other pixels in the cell, e.g. pixels P3 and P4. Some edge effects will be observed for some pixels at the boundaries of the cells, but these effects will typically be minor.

The pixel information transfer illustrated in FIG. 3 occurs at a transfer rate that matches the image motion rate during the exposure period. Rather than transfer the pixel information in the column direction all at once and then in the row direction, which would result in blurring, the pixel information is transferred during the exposure period in the row and column directions in a stepwise manner, for example 1 pixel up, 1 pixel over; 1 pixel up, 2 pixels over; 1 pixel up, 1 pixel over; 1 pixel up, 2 pixels over, etc., as generally shown in FIG. 3 by reference numeral 17, so as to substantially match the direction and rate of image motion to charge motion to minimize blurring.

FIG. 4 shows a preferred embodiment of the array 32 that accomplishes the two axis image motion compensation as described above. The array contains n×m cells, here n=4 and m=8. The array has 5,040 pixels in the column direction and 10,080 pixels in the row direction, thus the cells are square cells having 1,260 pixel elements on each side, some of which are illustrated in cell $C_{3,3}$. The designation fx n,m indicates the pixel information transfer rate for pixels in the row direction for cell n,m. The designation fy n,m indicates the pixel information transfer rate for pixels in the column direction for the cell n,m. A readout register 52 is placed below the array 32 and receives the pixel information from all of the pixels in the array and passes the information to signal processing equipment, as described in detail below.

The array 32 is preferably an electro-optic imager, such as a charge-coupled device or photodiode array. These devices have a photosensitive substrate that, depending on the choice of materials, can be sensitive to incident radiation at particular wavelengths, including those in the visible and near infra-red portions of the spectrum. The particular architecture for the array, the number of cells in the array, and choice of substrate will depend somewhat on the types of reconnaissance missions that are contemplated for the device, and the cost to performance ratio that is desired. Preferably, the array is chosen such that each pixel element can store charge representing pixel information and suitable control lines for each cell to permit the charge to be transferred along two axes in substantial synchronism with the scene image, as illustrated in FIG. 3.

Still referring to FIG. 4, each cell $C_{ij}$ has its own separate variable and adjustable charge transfer rate (generally determined in units of pixels or millimeters of charge motion per second or per exposure period) which is adjusted between successive frames to the estimated image motion rates for the pixels in the cell. The portion of the cell that is used by the signal processing circuitry to calculate the image velocity and direction and hence charge transfer rate could be chosen as the center of the column, or at one of the corners of the cell, or as an average. It will be readily understood that the charge transfer rates shown in the example of FIG. 2 are unique to the cell, and will typically vary from cell to cell, and from one exposure of the array to the next. As discussed in detail below, a camera control computer and associated drive and electronics circuit are used to adjust the charge transfer rates between successive exposures for each of the cells to ensure that, during the exposure period, the charge transfer rates for each of the cells are continually updated to closely match the image motion rates.

II. Determining Image Disparity (Motion) Information From System Inputs

The calculation of the proper pixel information transfer rates for each of the cells in the array 32 will be more fully understood with reference to FIG. 5A-C and 6A-J, and the following discussion of the effects of roll, pitch and yaw on image motion in the plane of an array.

The purpose of this section is to: 1) introduce the concept of image disparity, 2) relate image disparity to image motion rates, and 3) show how arbitrary, dynamic pointing geometries are integrated into the calculation of disparity.

Figure 5A:
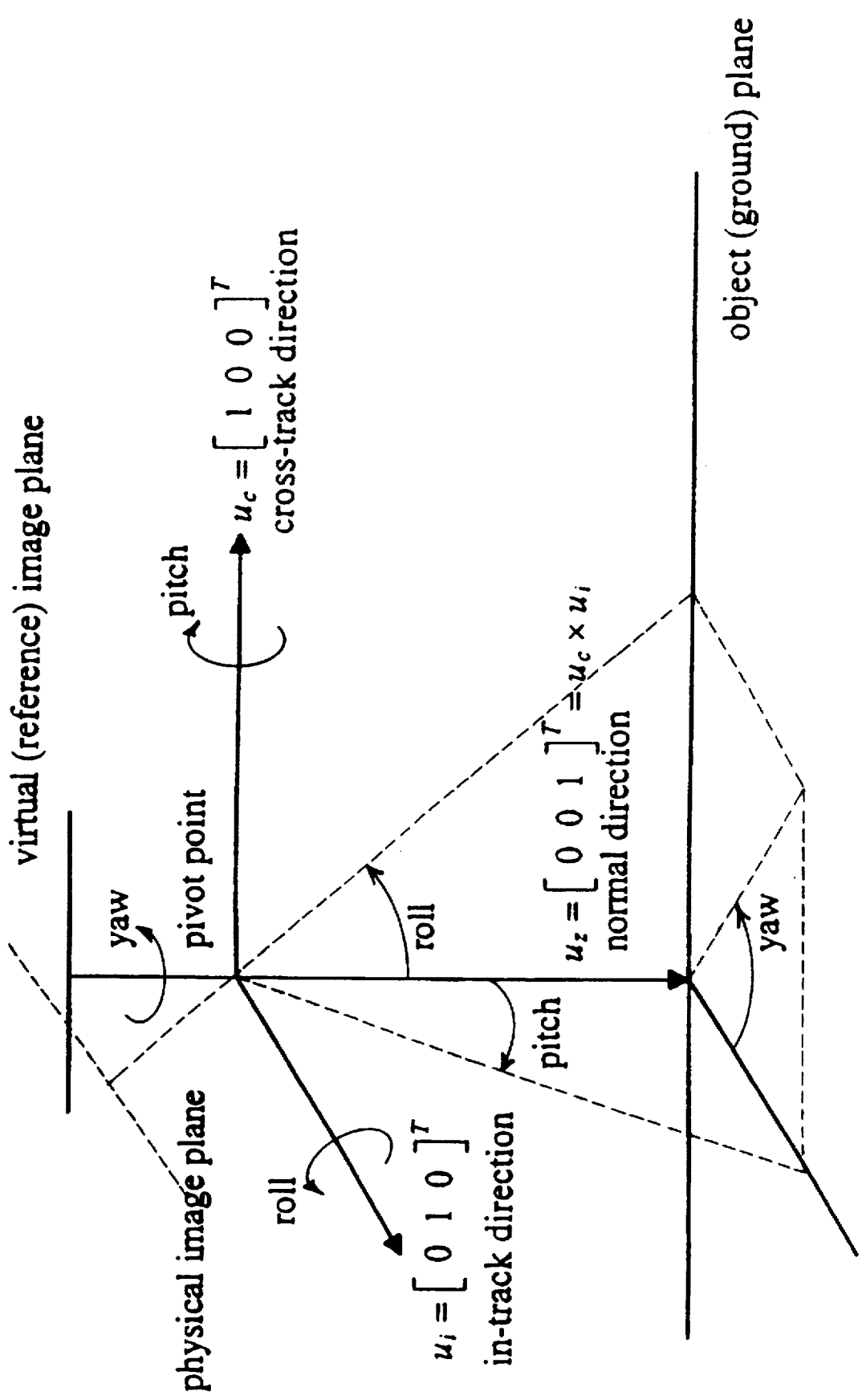
FIGS. 5A–5C are illustrations of the relationship between the physical image plane of the array and the virtual (reference or electronic) image plane, due to roll, pitch and yaw rotations that may be experienced by the array in the aircraft.
Figure 5B:
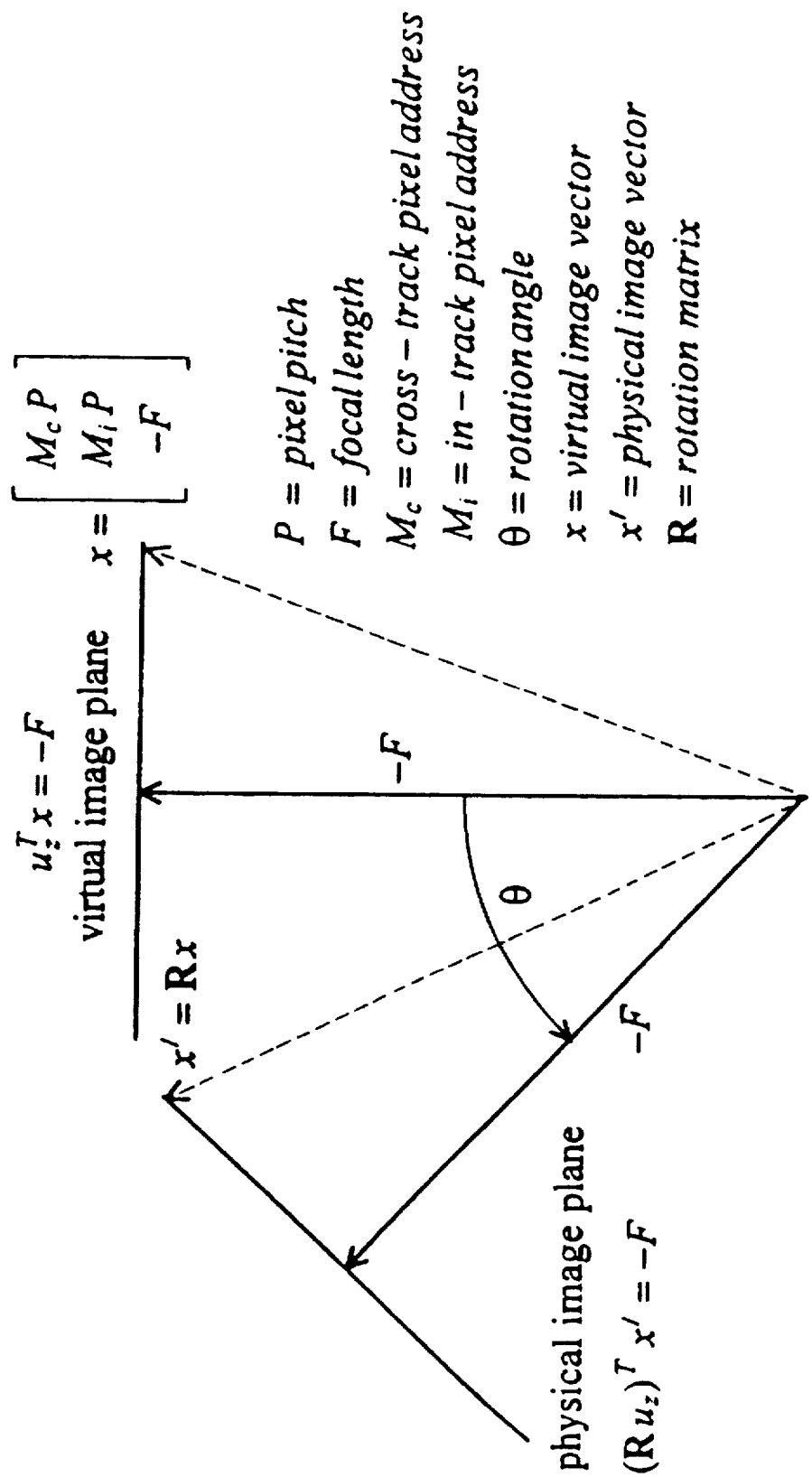
Figure 5C:
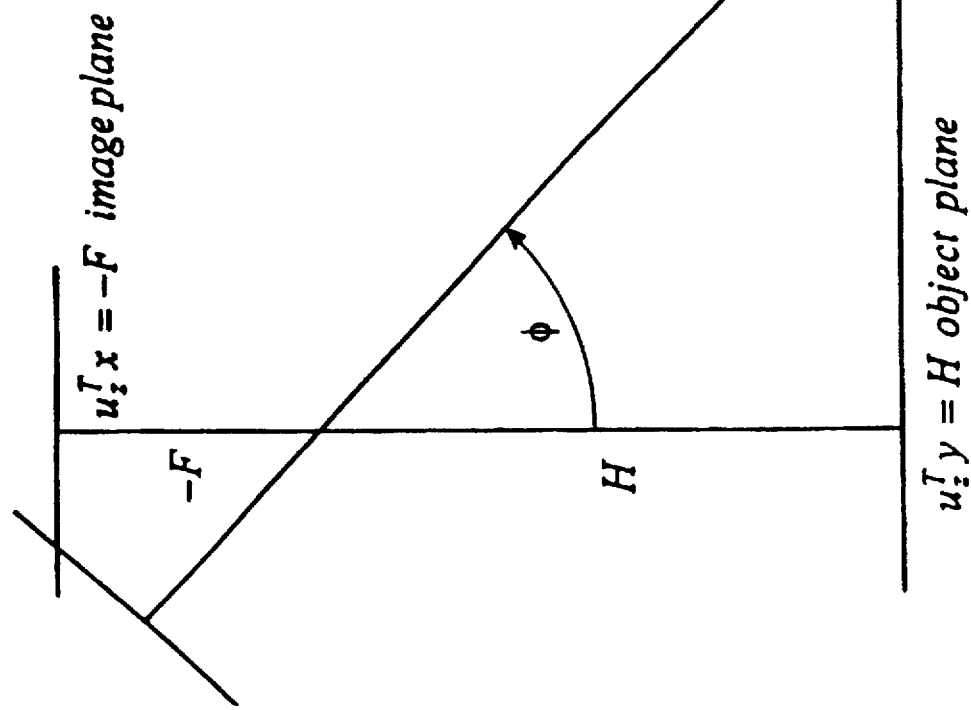

Let $$d_T(x) = \frac{x_T - x}{P} \quad (1)$$

be the image disparity (in pixels of size P) between an initial image point x and its final position $\chi_T$ after a time T has elapsed (see FIGS. 5A–C and the section Vector Notation below). Further, let $u_c, u_i, u_z$ be the unit vectors in the cross-, in- and normal-flight directions. We seek the cross- and in-flight average images rates, $$\frac{u_c^T \times d_T(x)}{T} \quad \text{and} \quad \frac{u_i^T \times d_T(x)}{T} \quad (2)$$

(in pixels/s) at each image point x; it will be shown that normal rates (as defined) always vanish.

Vector Notation

In this document, we use the following notation conventions:

1. Scalars (e.g. P,T,F) are written in upper case. Vectors (e.g. $\chi, d_T, v, y$) are written in lower case and are of the form [cross-track in-track normal]$^T$. Matrices (e.g. R, $\Delta$R) are bolded.

2. The transpose of $\chi$ is $\chi^T$; the dot product of x and y is the scalar $\chi^T y$.

3. In this notation, $\chi_0 =$ so that $d_0(\chi)=0$ for all $\chi$.

4. Image points x always lie in a "virtual" image plane facing Nadir (see FIG. 5B) regardless of the actual orientation of the physical image plane. Each virtual pixel is assigned a vector $\chi=[M_c P\ M_i P\ -F]^T$ where F is focal length, $M_{c,i}=-\tfrac{1}{2}N_{c,i} \ldots +\tfrac{1}{2}N_{c,i}$ are relative pixel addresses in the area array 32, and $N_c, N_i$ are the array's pixel dimensions.

To proceed further, we need the map which carries an image point x through an arbitrary rotation R and then to its corresponding object point y (see FIGS. 5B and 5C and the Rotation Notes section below). Regardless of R, object points must always lie in the $u^T_z y=H$ ground plane; likewise, image points invariably rests in the $u^T_z \chi=-F$ virtual image plane. This map and its inverse is given by:

$$y = \text{intersection of } Rx \text{ with object plane} = \frac{H}{u_z^T Rx} Rx \quad (3a)$$

$$x = \text{intersection of } R^T y \text{ with image plane} = \frac{-F}{u_z^T R^T y} R^T y \quad (3b)$$

By direct substitution, one can verify that maps (3a), (3b) are (despite being non-linear) "good" imaging equations: they invert each other, they leave image and object points on their respective planes, and they carry parallel lines into parallel lines.

Let the lens 40 (i.e. the imaging platform) move with velocity v. To each $\chi$ in the image plane there corresponds, by equation (3a), an object at y as defined by the current pointing matrix R. After a time T has elapsed, the same object, now at $y_T=y+vT$, is sent to $\chi_T$ through the current rotation $R_T$, where $\Delta R=R_T-R$ defines the pointing drift.

Alternatively, one may define the drift such that $R_T=\Delta R\ R$. In so doing, $\Delta R$ (like $R_T$ and R) is a unitary rotation. For small drifts, the two approaches are nearly identical. In any case, it is $R_T$ and R that is provided by the inertial navigation system. (For a completely different description of image motion, see Donald L. Light, *Film Cameras or Digital*

*Sensors? The Challenge Ahead For Aerial Imaging*, Photogrammetric Engineering and Remote Sensing, Vol. 62, No. 3 March 1996, pp. 285–291).

Therefore, using (3ab) and (1), we arrive at the following general results for image disparity at any pixel with addresses $M_c$, $M_i$:

$$d_T(x) = -\frac{1}{P}\left(\frac{F[R+\Delta R]^T[y+vT]}{u_z^T[R+\Delta R]^T[y+vT]} + x\right) \quad (4a)$$

$$y = \frac{H}{u_z^T R x} R x \quad (4b)$$

$$x = [M_c P \; M_i P \; -F]^T \quad (4c)$$

For every pixel address ($M_c$, $M_i$), we compute first $\chi$ using 4(c), then map $\chi$ into the y or object space using 4(b), and then use 4(a) to compute how much the pixel will move (a vector with three components with the z component equal to zero) during the exposure time interval T. Note that the normal disparity $u_z^T d_T(\chi) = 0$ as motion on the virtual plane has, by definition, no normal component.

Rotation Notes

1. The rotation matrix (see FIG. 5C)

$$R = R(\text{pitch, roll, yaw}) = R(\text{roll})R(\text{pitch})R(\text{yaw}) \quad (5a)$$

is defined by pitch-, roll- and yaw- angles about cross-, in-track and normal directions, the order being set by the navigation system (e.g., by the order of mechanical gimbals in the navigation system).

2. Each primitive rotation in 5(a) is given by $$R(\theta) = \begin{bmatrix} [\cos(\theta) & 0 & -\sin(\theta)]^T \\ [0 & 1 & 0]^T \\ [\sin(\theta) & 0 & \cos(\theta)]^T \end{bmatrix} \quad (5b)$$

where: $\Theta$=roll, yaw, pitch, the sign convention keeps positive rotations right-, forward-oblique and counter-clockwise relative to the platform, and where entries are placed relative to rotation axis ($\Theta$=roll shown).

3. Note that R, being a product of three unitary matrices, is itself unitary and, thus $$R^{-1} = R^T = R(-\text{yaw})R(\text{pitch})R(-\text{roll}) = R(-\text{pitch}, -\text{yaw}, -\text{roll}) \quad (5c)$$

4. In terms of angular rates, the drift term $$\Delta R = R(\text{roll}^T, \text{pitch}^T, \text{yaw}_T) - R(\text{roll, pitch, yaw}). \quad (5d)$$

It is helpful (but not essential here) to isolate the disparities' dependency on platform velocity, drift rotation and image coordinate by decomposing the image disparity general results (4) as follows:

$$-P d_T(x) = \begin{cases} \Delta R^T R x + \left[\dfrac{u_z^T R x}{H}\right](R+\Delta R)^T(vT), & v/H - \text{decomposition} \\[1em] \left[\dfrac{u_z^T R x}{H}\right]R^T(vT) + \Delta R^T\left(Rx + \left[\dfrac{u_z^T R x}{H}\right](vT)\right), & \Delta R - \text{decomposition} \\[1em] \left\{\Delta R^T R + ((R+\Delta R)^T(vT))\left(\dfrac{u_z^T R}{H}\right)\right\}x, & x - \text{decomposition} \end{cases} \quad (6)$$

These decompositions are valid only for suitably short time intervals, i.e., when the denominators in (4a) are nearly equal. Note that the [ ] –term in (6) acts as a space-variant magnification (or effective focal length) which reduces to –F/H when Nadir pointing. Though helpful, (6) will usually depart from (4): in general, calculating image disparity cannot be decomposed into separate additive problems.

With respect to the general result (4), we do not deny further "systematic" disparity (e.g. lens pincushion) that can be "calibrated out" independent of the imaging geometry.

Solution to two axis image motion problem

Figure 9:
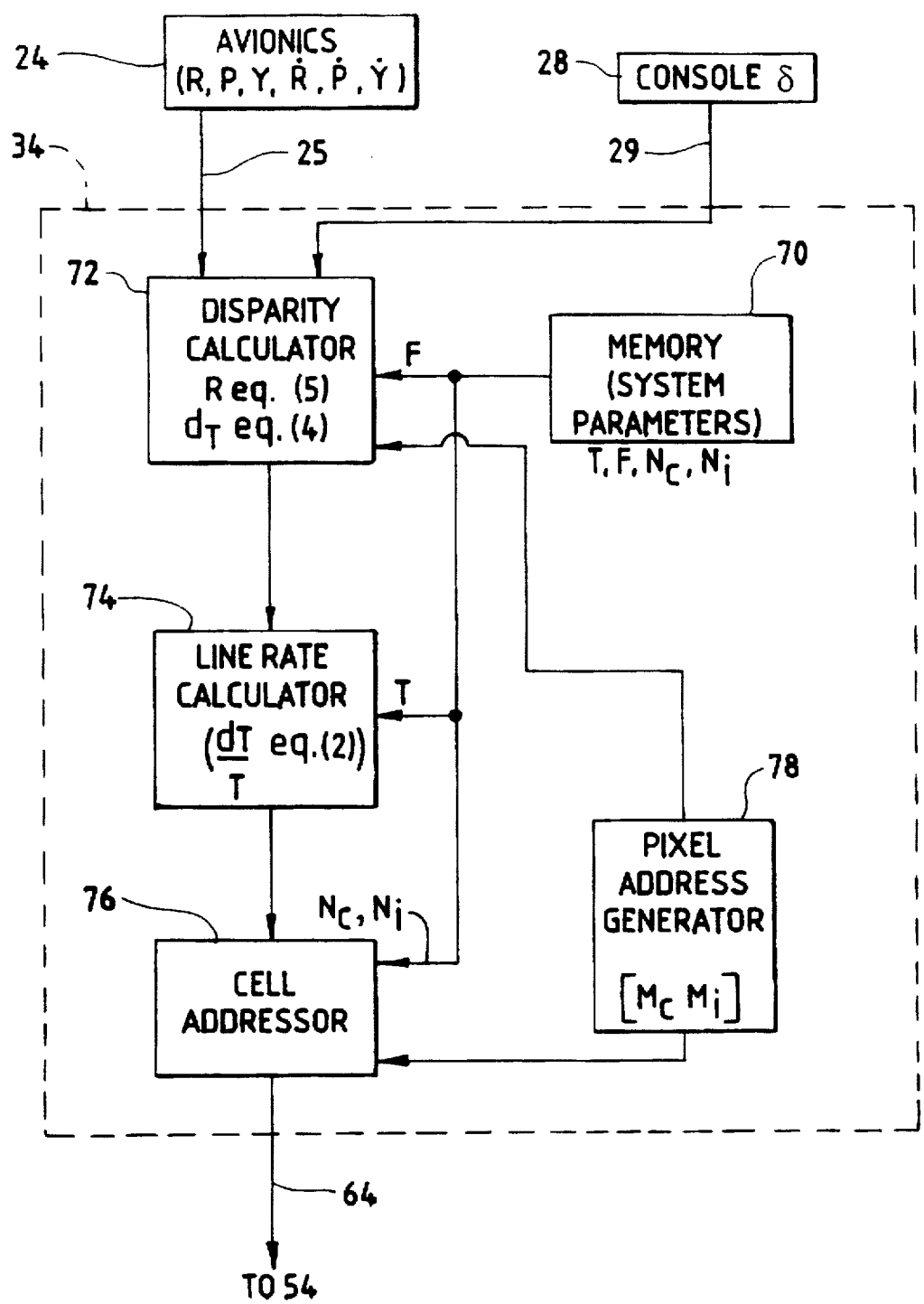
FIG. 9 is a detailed block diagram of the drive and control circuitry shown in FIG. 8, illustrating the counter and clock drivers which transfer pixel information in each of the cells of the imaging array.

We compute image transfer rates in the cross-line of flight and in-line of flight directions for each cell in array 32 by calculating, in order, (4c), (4b), (4a) and finally (2). This calculation, illustrated in the block diagram of the camera control computer in FIG. 9, is done for each cell in the array. For example, where the array is a grid of 16×16 cells, the calculation is done for 256 cells, and results in charge transfer rates in the row and column directions for each cell in the array. These 512=256×2 transfer rates are then rounded to the nearest clock rate permitted and latched to each of the 256 cell-control counters. During the exposure interval, the image (photodetector charge) is electronically transferred (in both directions) at the predicted rates for each cell in the manner described above in conjunction with FIG. 3. This process is also described in further detail below.

The actual cell size chosen for the array depends on the particular application, the maximum acceptable image smear, and on array fabrication limitations. Typical cell dimensions are weighed in the next section.

EXAMPLES

Two examples, typical of aerial reconnaissance, will demonstrate the utility of two-axes motion compensation: the first (see FIGS. 6A–6F) at a "high" frame rate (v/H=600 knots/500 ft) and a "wide" FOV (F=1.5 in), the second (see FIGS. 6G–6I) at a "low" frame rate (v/H=600 knots/15 kft) and a "narrow" FOV (F=16 in).

In these examples, the angular rates of rotation for the aircraft (roll, pitch and yaw) are 30, 10, and 10 deg/s, respectively; the array dimensions [cross in]-track are N=[10080 5040]; the pixel sizes are P=12 µm; and the exposure time interval is T=16 ms. Other conditions are as follows:

initial pointing=R=R(0,0,0)=nadir drift pointing=$\Delta R$=R($\Delta$pitch, $\Delta$roll, $\Delta$yaw)−R(0,0,0)

array dimensions [cross in]=N=[10080 5040]

grid size [cross in]=[9 9]

FIGS. 6A–6F depict the image disparity for the system parameters as given above in the first example. As always, disparities can be directly scaled to image transfer rates using (2). The image is transferred at these rates so as to cancel the corresponding image smear (that is, disparity). The legends at the tops of the Figures give the number of individual pixels in the cross-track (row) and in-track (column) directions that the image moves for the far, center and near edges of the array. Note further that the array 32 in FIGS. 6A–6J is rotated 90 degrees from the orientation in FIG. 4.

Figure 6A:
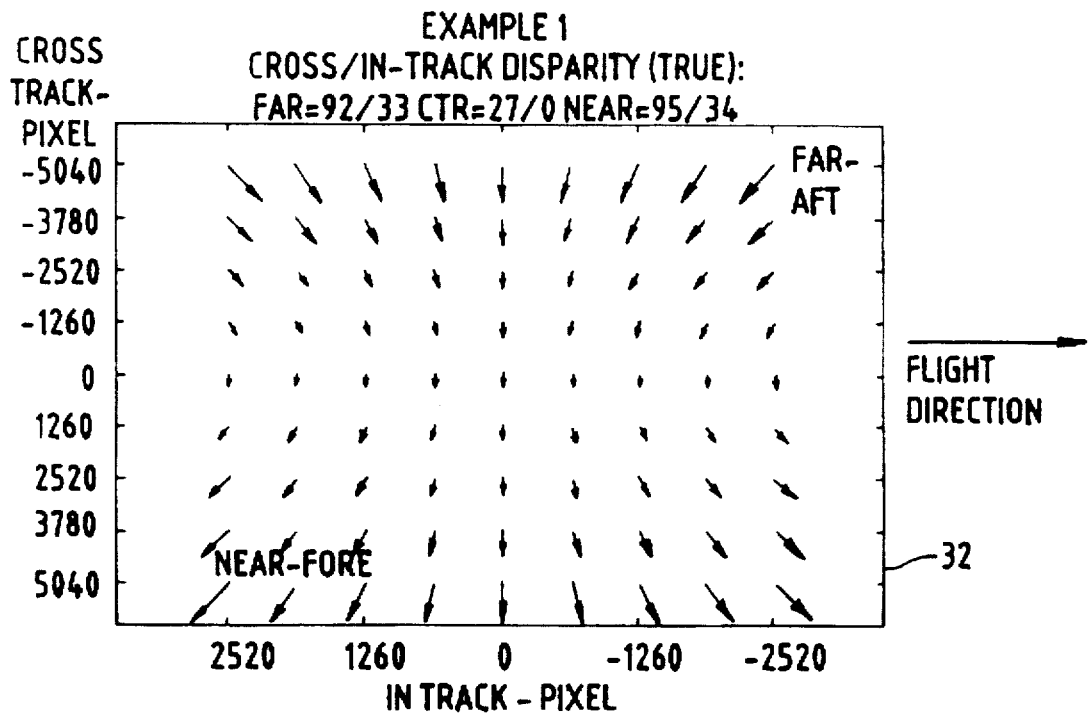
FIG. 6A is an illustration of an example image motion in an array due to roll motion only, with the array organized into 81 cells.
Figure 6B:
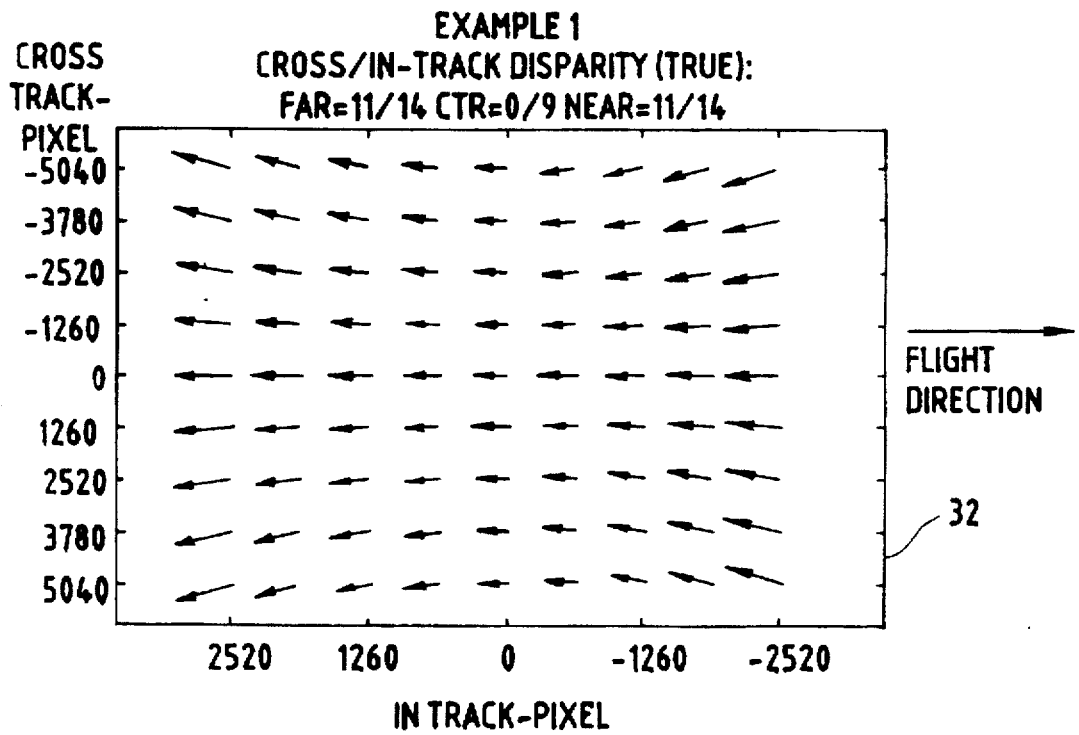
FIG. 6B is an illustration of an example of the image motion in the cells of an array due to pitch motion only.

FIGS. 6A–6C demonstrate how disparity from equation (4) varies in both in- and cross-line of flight axes given a stationary platform and three typical drift processes, i.e., roll, pitch and yaw. Here, pointing drift is solely responsible for image motion. FIG. 6D shows the net disparity with all three drifts combined, as per equation (5).

Figure 6E:
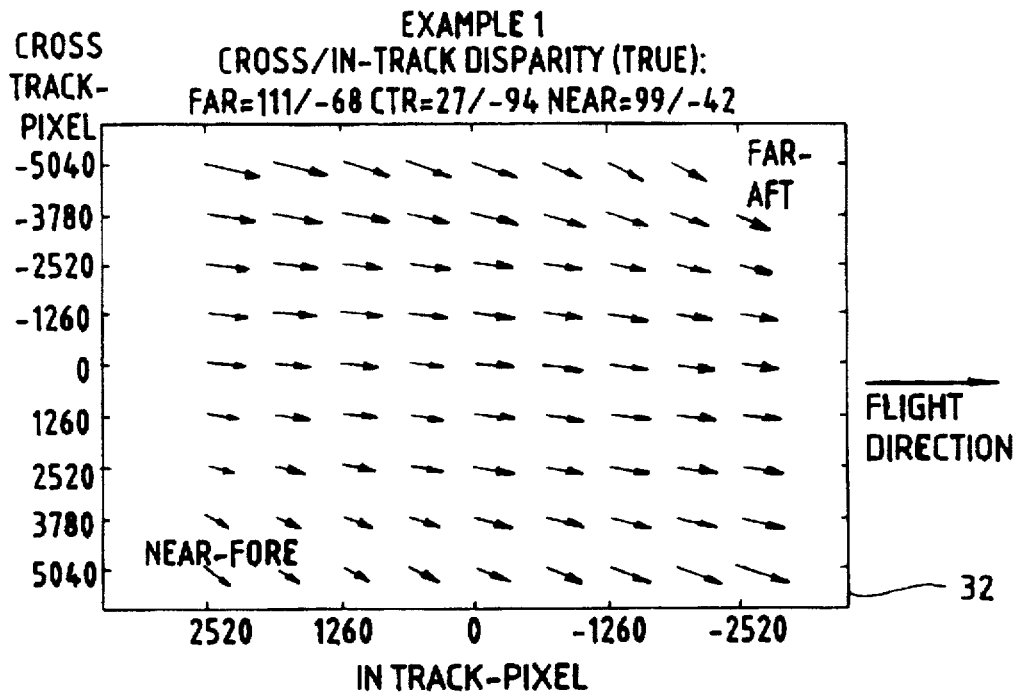
FIG. 6E is an illustration of the image motion in the cells of the array with image motion due to the forward motion of the aircraft and the roll, pitch and yaw image motion from FIG. 6D.

FIG. 6E gives the total disparity (4) when the platform velocity is included. Note that this drift process cause the cross-track disparity (normally zero under constant pointing) to actually exceed the in-track disparity (except at the center-most field position).

Figure 6F:
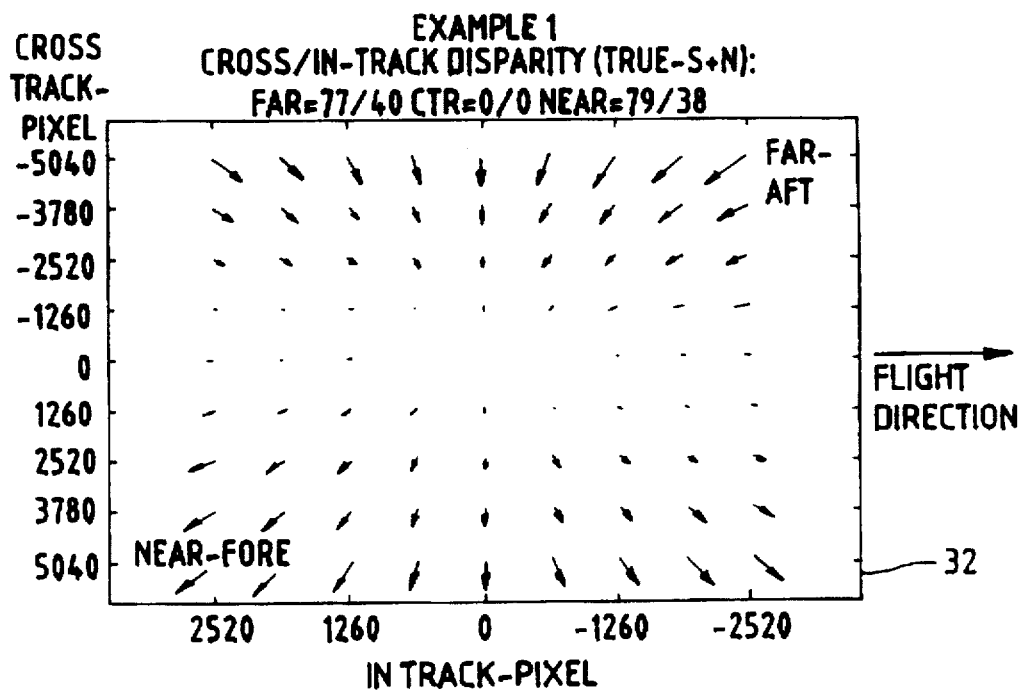
FIG. 6F shows the error in image motion compensation if approximate disparity according to equation (6), instead of actual disparity according to equation (4), in the example of FIG. 6E.

FIG. 6F shows the exact disparity (4) compared with the linearized disparity (6). The error in the linearized disparity (up to 79 cross- and 40 in-track pixels) is substantial and illustrates why exact disparity according to equation (4) is used.

Figure 6G:
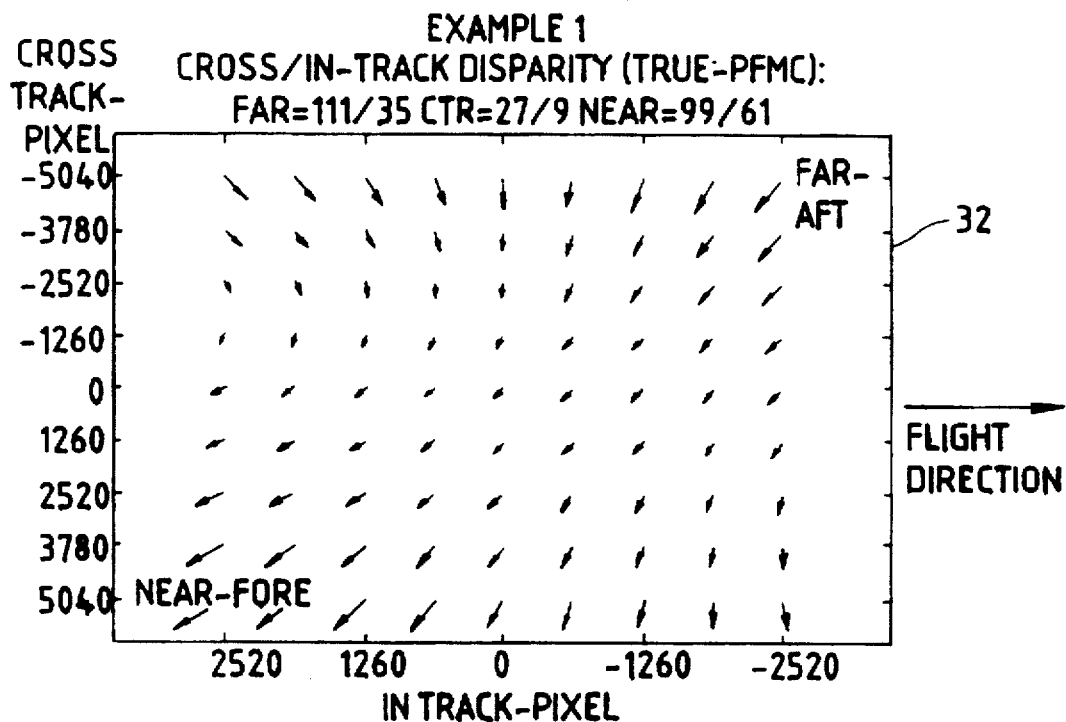
FIG. 6G shows the error in image motion compensation if graded image motion compensation is performed without compensation in the cross-line of flight direction, given the conditions for FIGS. 6A–6C.

Exact disparity (4) compared with the graded image motion compensation in one axis only is shown in FIG. 6G. Again, the disparity error is quite substantial (up to 111 pixels in cross-line of flight and 61 pixels in-line of flight).

Figure 6H:
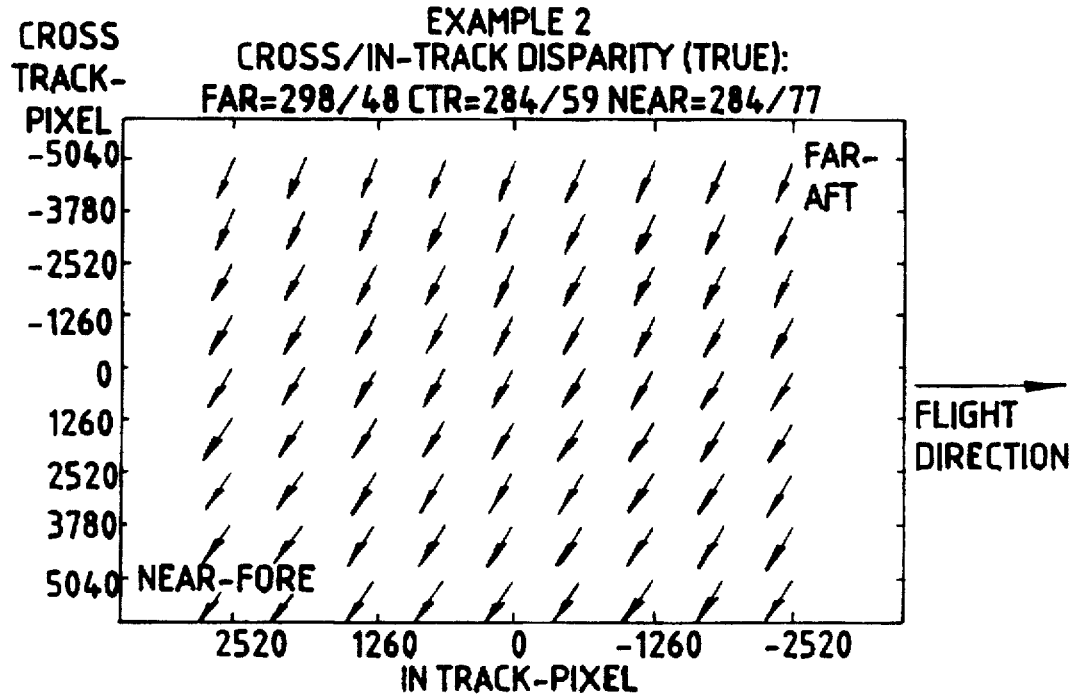
FIG. 6H shows a representative example of image motion in the array given a second set of conditions.
Figure 6I:
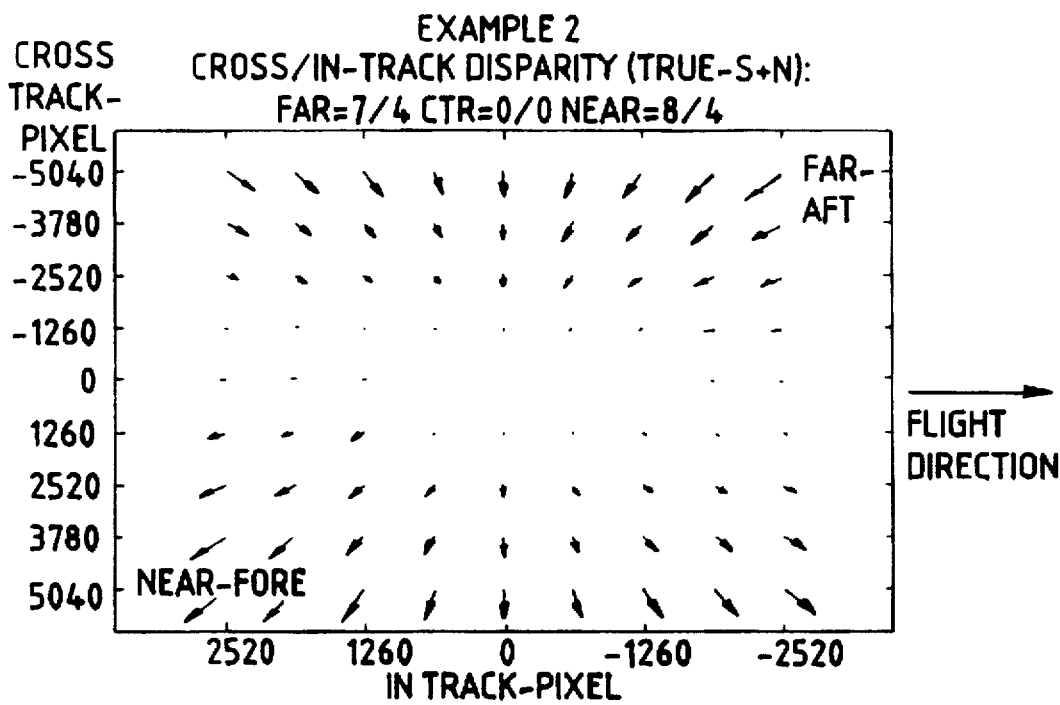
FIG. 6I shows the error in image motion compensation if approximate disparity according to equation (6), instead of actual disparity according to equation (4), in the example of FIG. 6H.
Figure 6J:
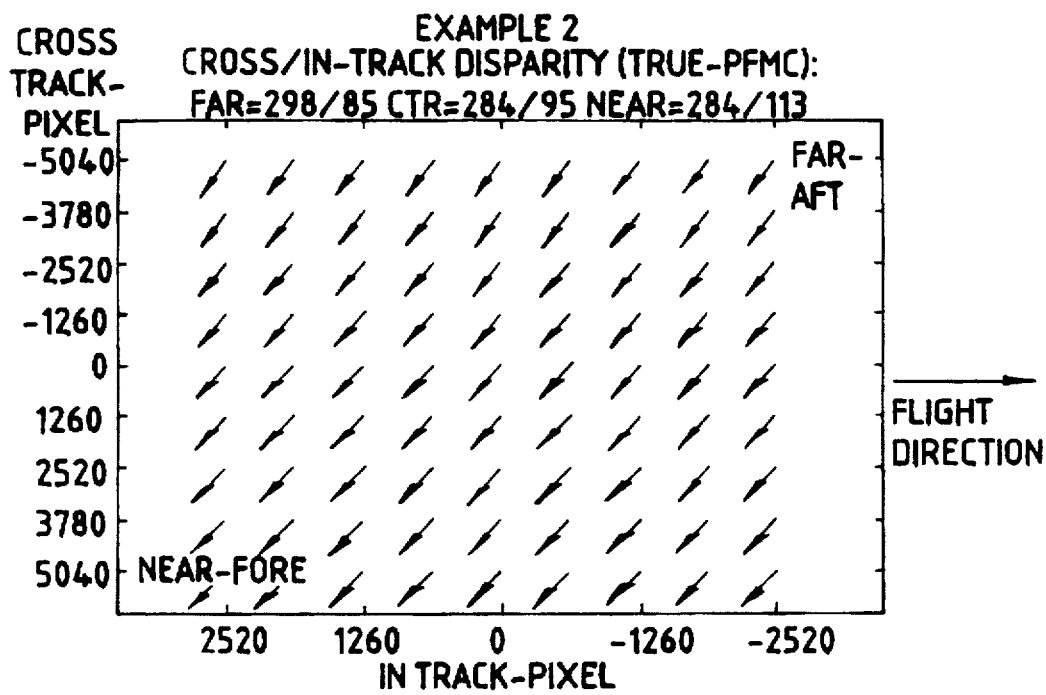
FIG. 6J shows the error in image motion compensation if graded image motion compensation is performed without compensation in the cross-line of flight direction, given the conditions for FIGS. 6H.

FIG. 6H shows the image motion for the conditions in the second example given above, combining the effects or roll, pitch and yaw, and platform velocity. FIG. 6I shows the error in the approximate disparity (6), which is eliminated if actual disparity according to (4) is calculated. FIG. 6J shows the error that occurs if the prior art one-axis graded image motion compensation in one axis used with the second example conditions.

The principal results of both examples is summarized in Table 1. The Table gives the maximum residual image smear in terms of pixels in the cross- and in-line of flight direction for different cell sizes. Note that, for the second example, a graded FMC actually cause more residual smear than had no compensation been attempted (113 vs. 77 in-line of flight pixels in FIGS. 6G"6I). Thus, the exact image transfer equations (2), (4) are useful even when the imaging array supports only single-axis transfers.

TABLE 1

Summary of two-axis motion compensation for the examples in Section II at three possible sectorization (i.e., cell partition arrangement) for an array having 10080 × 5040 photosites

| | | Maximum Residual Image Smear (Cross/In Track) | | | | | |
|---|---|---|---|---|---|---|---|
| | | Cell Size: 1/1 Sectorization: 10 080/5040 (ideal) | | | | 638/630 | 315/315 |
| Ex. | FIG. | None | Graded | Approx. | Two-Axes | 16/8 Two-Axes | 32/16 Two-Axes |
| 1 | 6A–6G | 111/94 | 111/61 | 79/40 | 0/0 | 28/16 | 9/8 |
| 2 | 6H–6J | 298/77 | 298/113 | 8/4 | 0/0 | 2/4 | 1/2 |

III. Preferred Implementation

With the above discussion, examples and overview in mind, and with reference to FIG. 7A, a preferred form of the invention is implemented in a reconnaissance system 20 installed in an aircraft 22 that defines orthogonal roll, pitch and yaw axes R, PI and Y, respectively, each passing through a center of gravity CG. The roll and pitch axes define a bilateral plane BP that is horizontal during level flight. The reconnaissance system 20 includes a camera assembly 36 defining a lens axis LA that can be directed toward a scene of interest.

The aircraft 22 has an avionics system 24 which provides to the system 20 input signals indicating aircraft ground velocity (V), aircraft height above ground (H), and aircraft roll, pitch and yaw angular position and rate data. From console 28, an operator 26 provides additional inputs into the system 20, such as the depression angle δ between axis LA and a horizontal plane. The inputs from the avionics system 24 and console 28 are fed to a camera control computer 34 which processes the inputs, together with pre-flight programmed information, and generates control signals for the camera assembly 36.

Referring to FIG. 7B, the camera assembly 36 includes the imaging array 32 defining a focal plane FP having a center point CE. The camera assembly 36 also includes a housing 38 and a lens 40 having a focal length F (not shown in FIG. 7B) and defining axis LA that passes through point CE. Aperture plane AP passes through the aperture of lens 40 perpendicular to axis LA. A shutter 41 is provided to selectively expose the array 32 to radiation from the scene. Typically, the camera housing 38 is passively isolated from the aircraft 22 in order to reduce vibration or other high frequency, low-amplitude motions. The array 32 does not need to be mounted to a stabilized platform, but rather compensates for roll, pitch and yaw motion by controlling the charge motion in the array. Printed circuit cards 39 incorporate the electronics that support the operation of the array 32. Suitable cooling devices may be then placed within the camera housing to cool the array 32 to reduce dark current.

Referring to FIGS. 7A–7B and 4. During the exposure time period when the shutter 41 is open, charge representing scene information is collected in the pixels in the array 32 and is transferred from one adjacent pixel to another according to the particular charge transfer rates for the cell. When the exposure time period ends (i.e., when shutter 41 closes), the accumulated charge representing the scene is sequentially read out of array 32 one row at a time into the readout register 52. From the readout register 52, the information is fed to the signal processing circuitry. When the readout is complete, the array 32 is ready for the next scene exposure. At this point, and as discussed in detail below, the charge transfer rates for each of the cells are updated depending on new inputs, such as aircraft velocity, height, camera depression angle, and new inputs as to roll, pitch and/or yaw. In this manner, the charge transfer rates are continually adjusted between successive frames to match the charge transfer rates in the several cells with the image motion rates in the cells. It will be understood that the shutter 41 can be implemented either mechanically, or electronically within the array 32 by dumping accumulated charge just prior to the exposure period.

Figure 8:
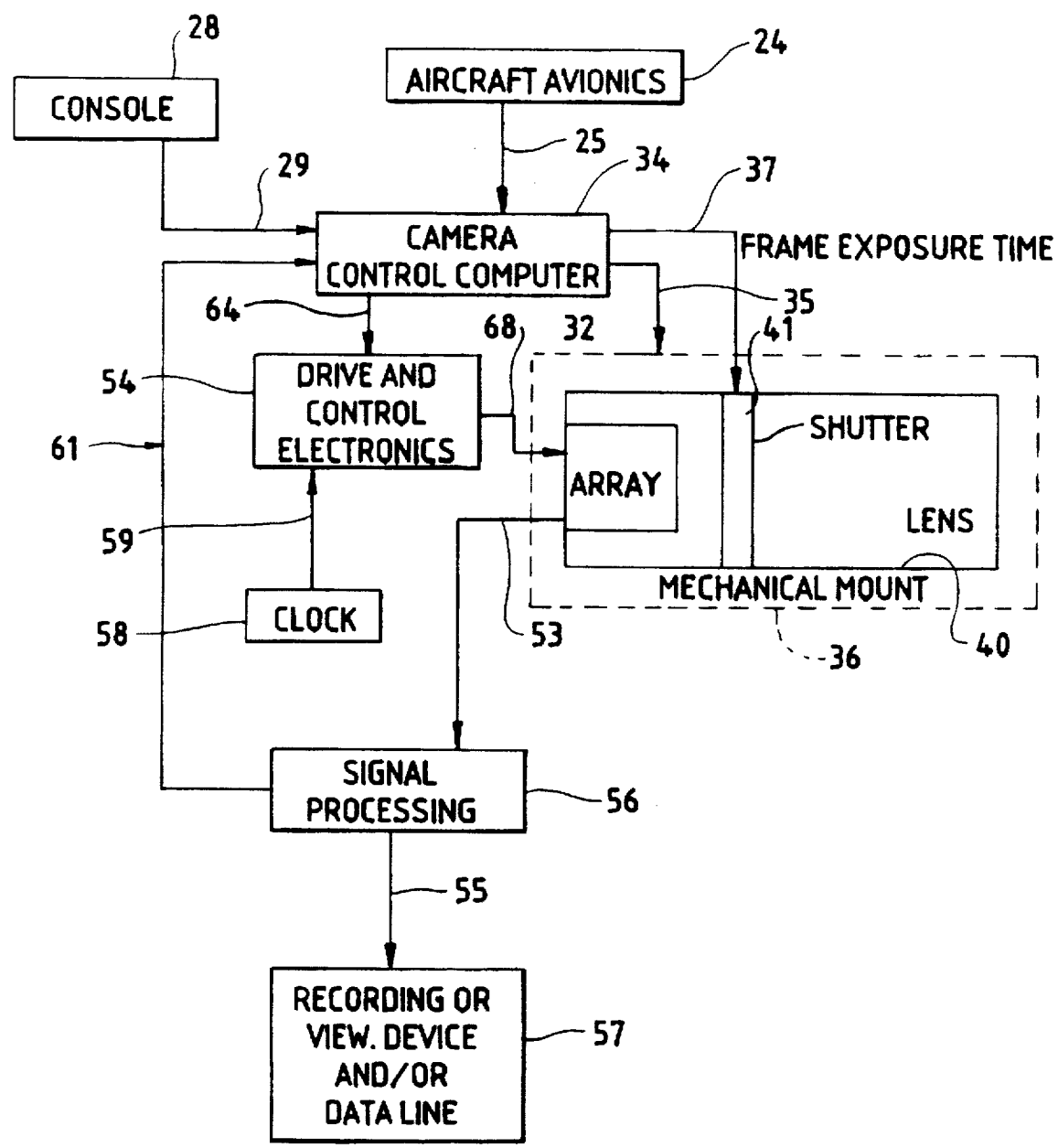
FIG. 8 is a block diagram of the system electronics that control the operation of the array of FIGS. 1–7.

Referring to FIG. 8, the camera assembly 36 and its associated control circuitry are illustrated in block diagram form. The aircraft avionics system 24 provides velocity, height and roll, pitch and yaw angle and rate information over a bus 25 as inputs to the camera control computer 34. From the console 28, the operator inputs into the computer 34 over a bus 29 the depression angle δ in degrees (FIG. 2). Stored in the computer 34 are mission parameters that are previously determined, e.g., focal length F of the lens 40, the size of the array 32, the number of cells and the partitioning of the array, the pixel size, a control circuit master clock frequency (discussed below), and any other constants, such as whether the array is used in a side oblique or forward oblique mode.

The computer 34 determines the charge transfer rates from equations (2) and (4) above, and the system inputs. After processing the data inputs, the computer 34 transmits signals over a bus 35 that enable lens axis LA of camera 36 to be directed to the desired orientation, transmits signals over a bus 37 that controls the frame exposure time period by enabling opening and closing of shutter 41, and transmits command signals over a bus 64 to the drive and control electronics 54. The drive and control electronics 54 transmits signals over a bus 68 that controls the charge motion in the cells of the array 32 to transfer pixel information located in the cells at the proper two-axis transfer rates. A master clock 58 issues pulses over a conductor 59 at a predetermined master clock frequency to the drive and control electronics 54. Alternatively, the master clock pulses may be supplied by the computer 34.

The output video containing scene information from the imaging array 32 is fed over a bus 53 to a signal processing unit 56 which, in turn, sends the information over a bus 55 to a recording or viewing media 57 such as a tape, or to a data link for transmission to a remote location. The signal processing unit 56 also provides exposure control feedback to computer 34 over a bus 61 so that the frame exposure time may be adjusted to optimize signal collection.

Referring to FIG. 9, the camera control computer 34 is shown in greater detail in block diagram form, in order to illustrate the elements in software and hardware that determine the charge transfer rates from equations (2), (4) and (5). The avionics or inertial navigation system 34 supplies roll, pitch and yaw angle and rate data via a bus 25 to an image disparity calculator 72. Camera depression angle δ information is supplied by the operator console 28 via bus 29. A memory 70 stores system parameters, including the focal length for the lens 40, the exposure time T, the partitioning of the cells and pixel size, etc. The disparity calculator calculates the rotation matrix R from equation (5), and the image disparity vector $d_T$ from equation (4) from these inputs and the focal length F.

The image disparity calculator 72 passes the rotation matrix R and image disparity vector data to a line rate calculator 74, which calculates line rates for the cells according to equations (2). The line rates are passed to a cell addressor 76, which takes the line rates and array partition information $N_c, N_j$, and pixel address from a pixel address generator 78, to generate counter values for the row and column directions for each of the counters in the drive electronics.

It will be appreciated that a memory (not shown) is provided in the camera control computer 34 which stores a software program for calculating the line rates for the array in the manner described in detail above. A person of ordinary skill in the art will readily be able to write such a program given the explanations and algorithms set forth herein.

Figure 10:
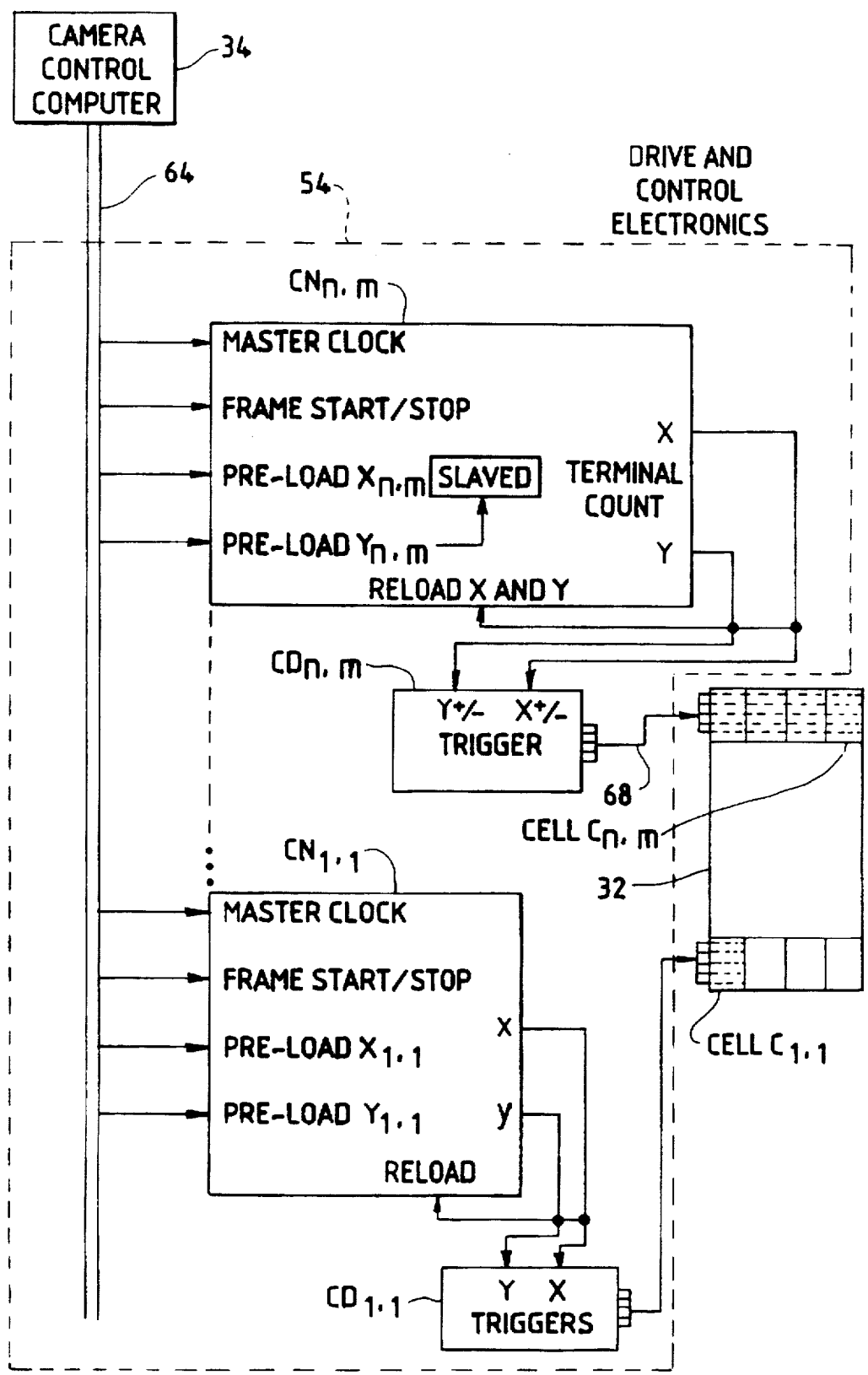
FIG. 10 is a block diagram of the camera control computer showing functions for determining the charge transfer rates for each of the cells in the array.

Referring to FIG. 10, the drive and control electronics 54 is shown in greater detail, and illustrates an embodiment in which master clock pulses are provided by the camera control computer 34, instead of from an external clock. The camera control computer 34 calculates the transfer rates for the cells in the row direction $Fx_{ij}$, and the transfer rates for the cells in the column direction, $Fy_{ij}$, where i=1 . . . n and j=1 . . . m for an array with n×m cells. A set of counters $CN_{1,1}$ . . . $CN_{n,m}$ and associated clock drivers $CD_{1,1}$-$CD_{n,m}$ are provided. The outputs of counters $CN_{ij}$ are connected to x +/- and y +/- trigger inputs of clock drivers $CD_{ij}$. Representative counter $CN_{1,1}$ for cell $C_{1,1}$ receives inputs over data bus 64, including pulses from a master clock located inside computer 34, a frame start/stop signal, and two preload signals for the X (row) and Y (column) directions. The pre-load signals represent counter values $CX_{ij}$ and $CY_{ij}$ which are related to the charge transfer rate for cells. The pre-load signal for the Y direction is slaved to the preload for the X direction.

When counter $CN_{1,1}$ counts to the counter value associated with the X and Y pre-load values, trigger signals are sent by the counter to the trigger inputs for the clock driver $CD_{1,1}$. The clock driver $CD_{1,1}$ in response issues clocking pulses over a four phase output bus 68 to the pixels in the cell C1.1 to transfer pixel information uniformly by one row (when the X terminal count is reached), and one column (when the Y terminal count is reached). This process of counting to a counter value and triggering a clock driver may repeat any number of times during the scene exposure depending on the rate of image motion in plane FP of array 32 (FIG. 7B). The faster the rate of image motion in the plane of the array, the more times the counting and triggering cycle must be repeated in order to synchronize the image motion with the charge motion in the array 32.

Note further that the counter preload values may be either positive or negative, depending on whether the charge is to be transferred up or down or right or left in the array.

Still referring to FIG. 10, input signals from the camera control computer 34 travel via data bus 64 to each of the counters $CN_{1,1}$-$CN_{n,m}$ for each of cells $C_{1,1}$-$C_{n,m}$. These signals include master clock signals, a frame start and stop signal, and the pre-load values for the X and Y directions.

Figure 11:
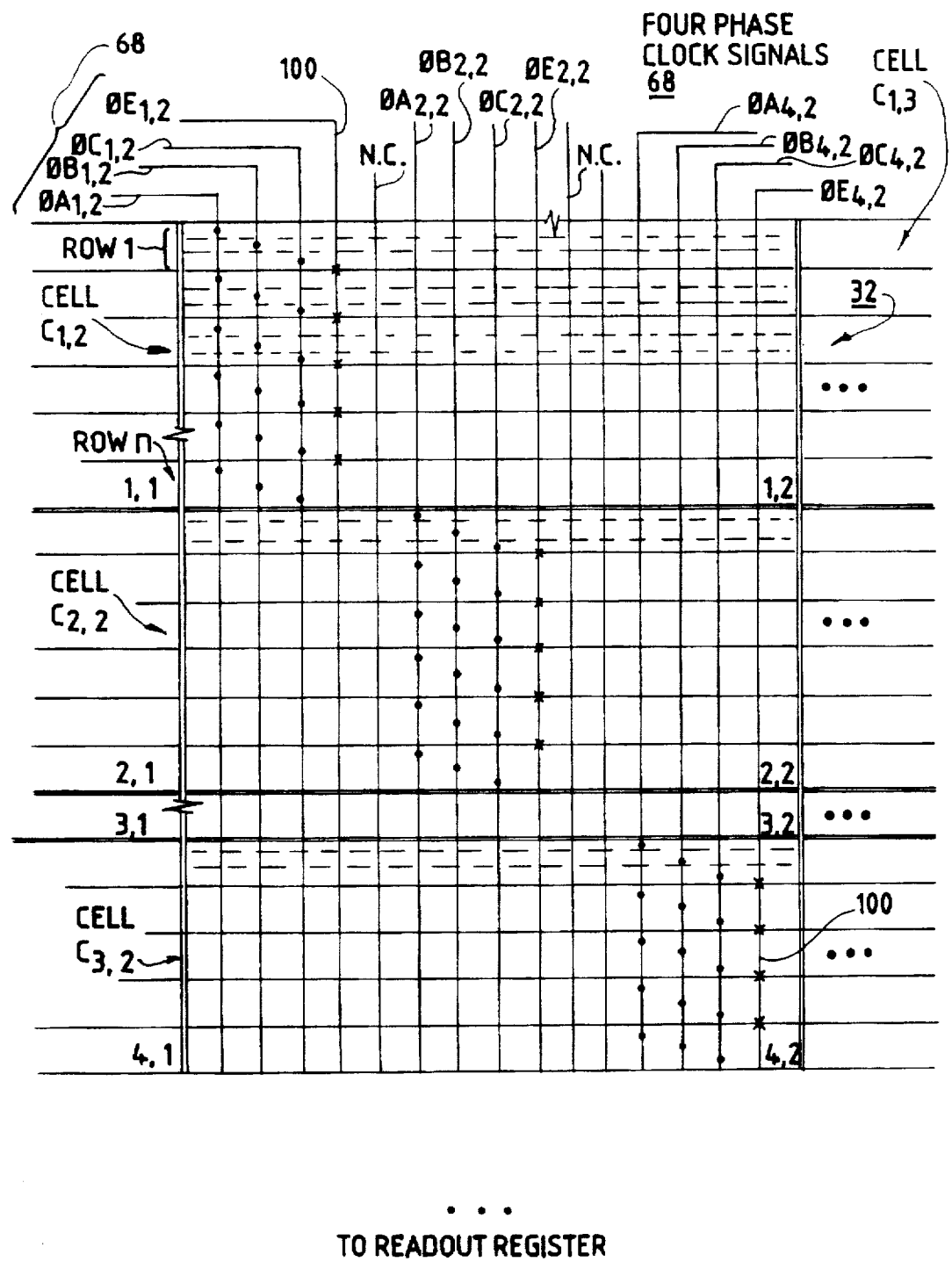
FIG. 11 is a schematic drawing of one section of an arbitrary cell showing the metalization on top of the channel stop region between photosites of the array to provide the drive clocking to the cell and to transfer charge from one pixel to another in the row and column directions.

FIG. 11 shows several cells in the array 32 with the four phase clocking. The clock drive signals are provided from the top of the array 32 and pass through metalization regions 102 above the channel stop region (N.C.) between photosites. Note that a given row need not be contacted at every column position in a cell, as the contacted signal is conducted horizontally down the polysilicon layer in the surface of the array. Thus, some metal lines 100 (vertical) can be floated or grounded for noise suppression isolation. Additional metal lines 100 are available to route the clock drive signals to the inner cells, i.e., $C_{2,2}$ and $C_{3,2}$ in the figure.

Greater than three clock drive signals are required for each cell to allow bidirectional charge transfer in both the X and Y directions. The channel stops will also have aligned discontinuities to allow horizontal charge transfer as required. This physical alignment and the vertical to horizontal charge transfer must be synchronized, hence the requirement for the "X" counter to be slaved to the "Y" counter in FIG. 10.

It will be appreciated that the particular details in the construction of the array gates for transfer of charge in the horizontal and vertical directions are matters that are well within abilities of persons of skill in the art of charge-coupled device design and fabrication. These details will depend somewhat on the type of imager chosen to implement the invention.

The charge-coupled device architecture shown in FIG. 11 is essentially a full frame imager configuration. The full frame configuration provides a large area array with a high percentage of silicon wafer area available for light collection. By contrast, a frame transfer architecture requires a frame storage region which occupies approximately the same amount of silicon wafer area as the imaging area. The interline transfer architecture is not as desirable since it does not provide the image resolution and small pixel pitch of the full frame design. The interline transfer architecture also requires a vertical transport register which adds non-sensitive spacing between adjacent pixels, reducing fill-factor and resolution. An X-Y addressable charge injection device is another possible architecture for the present invention. A discrete array of diode detector elements is also a possible architecture for the invention. Such an array or the above-mentioned architectures could operate in the ultraviolet, visible, or infrared spectral regions.

Nevertheless, the teachings disclosed herein can be readily adapted to these architectures should they be preferred for other reasons, and the scope of the present invention is intended to cover these alternative architectures.

IV. System Operation

Referring to FIGS. 7-11, the operation of the imaging array in a side oblique mode to provide two axis image motion compensation will be discussed. When the operator is ready to begin taking pictures, he or she selects a depression angle δ (FIG. 1) to image the terrain scene of interest. At this time, the avionics system 24 provides to the computer 34 the velocity and height data, as well as roll, pitch and yaw angles and rates of rotation for the aircraft. The camera control computer 34 calculates the rotation matrix R and the charge transfer rates for the row and column directions for each cell according to equations (4) and (2) for the current aircraft data just prior to the scene exposure. The computer 34 then calculates the pre-load counter value for each counter CN in the drive and control electronics 54, and issues the pre-load values to the counters over the bus 64.

When the operator triggers a frame to take a picture, the shutter is simultaneously opened for an exposure time period calculated by or stored in the computer 34. In this example, the exposure time period is 0.01 second. At the same time, each counter in drive and control electronics 54 begins counting at the master clock frequency to its pre-loaded counter value. The counting may be up to the counter value or down to 0 from the counter value. When the counter counts the predetermined number of counts, a trigger signal is sent from the counter CN to the clock drive CD for that counter, and one cycle of clocking is triggered in the cell. Pixel information (electric charge packets) containing scene information is thereby shifted down (or up) one row vertically in the column direction in all the columns in that cell. The same process of counting and triggering occurs for the row direction for all the rows in the cell.

After issuing a trigger pulse to the clock driver CD, the counter CN then automatically reloads and begins counting to the counter value again. When the counter value is reached again, the trigger pulse is sent, the clock driver CD shifts the pixel information one row vertically in all the columns in the cell, the counter CN reloads and the cycle is performed again. The process is the same for the row direction. Meanwhile, the cycles of counting and triggering for the row and column directions are also being performed in the counters and clock drivers for the other cells. Because each cell has a different charge transfer rate and corresponding counter values, as necessary in order to match the charge transfer rate to the image motion rate, electronic image motion compensation in two axes without moving parts is realized throughout the array 32.

Although in the illustrated embodiment of FIG. 4 the imaging array 32 is divided into thirty two cells as a tradeoff between performance and cost, it may be desirable to use a higher number of cells. The more cells there are, the less error (image smear) there is at the boundaries between adjacent cells. However, with 64 cells, there must be twice as many counters and clock drivers, which introduces some additional cost and computational complexity. With fewer cells, e.g., 12, the control circuitry and processing time is reduced proportionately, thus lowering cost, but image smear near the edges of the cells may be unacceptable. The size of the array may be another factor when deciding how many cells to use. A sectorization arrangement having between 8 and 600 individual cells should be suitable for most purposes.

The above image motion compensation process will be described with further specificity using cell $C_{1,4}$ for illustration. During the exposure time period, the image moves at a rate and a direction which is resolved into two components, on in the cross-line of flight (row) direction and the other in the in-line of flight (column) direction. Assume in the present example that the image moves in the column direction at a rate of 39.92 mm/s, or down 33.26 rows (0.012 mm pixels) in 10 ms, as derived from equations (4) and (2). Assume that the image moves over at a rate of 13.5 mm/s, or over 11.25 columns in 10 ms, again from equations (4) and (2). Thus, pixel information or charge packets representing scene information must be shifted vertically down the columns of the column group by 33.26 pixels during a 10 ms exposure and over 11.25 pixels. More precisely, the charge packets must be moved by one pixel in the column direction every 0.01/33.26 seconds, and over by one pixel every 0.01/11.25 seconds.

To do this, counter $CN_{1,4}$ for cell $C_{1,4}$ is loaded with its particular pre-load counter values for the X and Y directions. If the master clock frequency is 10 MHz, or 100 ns/count, then the integration time of 0.01 seconds results in 100,000 master clock counts in the exposure time period. Thus, the counter value for cell $C_{1,4}$ is 100,000/33.26, or 3,006 in the column or Y direction and 100,000/11.25, or 8,889 in the row or X direction. Using the column direction for illustration, at the moment of opening the shutter, the counter, having been set to zero, begins to count at the master clock frequency up to 3006. At count number 3006 a match is obtained, and the clock driver $CD_{1,4}$ is triggered for a shift in the column direction. The charge packets in all the columns of cell are then are shifted by one row vertically in the column direction. Counter $CN_{1,4}$ is reset to zero and begins counting up to 3006 again. Thirty-three full cycles of counting and triggering are obtained in the exposure period, and during the remainder of the integration time, no more clock cycles are triggered. The same process occurs for shifting in the row direction, with the counter counting up to 8889, triggering a cycle of clocking in the row direction, resetting the counter to zero, counting again, etc. Thus, the pixel information is transferred in a stepwise manner in unison for all the pixels in the cell $C_{1,4}$.

In the present example, note that if the exposure time period is reduced to 0.005 second, the image motion in the column direction becomes 33.26/2 or 16.33 pixels during the integration time, and the total of master clock counts during exposure is halved as well to 50,000. However, the counter value remains the same. Thus, the exposure period is not critical to the implementation of the invention, and can be varied by the operator without affecting the image motion compensation.

The process described above for arbitrary cell $C_{1,4}$ is performed in parallel for the other counters and clock drivers of the array 32. At the end of the scene exposure, the shutter is closed and the pixel information is read out of the array 32 into the readout registers 52. When the operator is ready to take another picture, the camera control computer determines the new rotation matrix R and image motion rates in the two axes for each of the cells based on new inputs, and the process repeats.

CONCLUSION

The foregoing description of the preferred and alternative embodiments has assumed that the imaging array 32 is a single, monolithic detector. It is possible to make a detector that is equivalent to the imaging array disclosed herein by piecing together in mosaic fashion smaller individual area arrays to make one large array. The individual arrays (perhaps 4, 20 or even 100) are electronically combined into cells and include a means for transferring pixel information located in the cells in the row and column direction at transfer rates to match the image motion rates. One such array that could be used as an element of the "mosaic" is the Thomson CSF THX 31157 charge-coupled device, with the gate structure modified as necessary to accomplish charge transfer in the row and column directions. In the mosaic, each charge-coupled device could be separately controlled as an individual cell. In the appended claims, the term "array" is accordingly intended to include either a single, monolithic array or an array composed of individual arrays electronically, optically or physically combined together, or individual discrete detectors mounted in a hybrid mosaic array.

While the foregoing description of the preferred embodiment has set forth an exemplary method and apparatus for achieving two axis image motion compensation in an electro-optical imaging array, those of ordinary skill in the art will appreciate that many alternatives can be used without departing from the spirit and scope of the invention as defined in the appended claims. For example, digital electronic control circuits other than those disclosed can be used to control the charge transfer rates in the column groups of an imaging array. Moreover, analog circuits, delay circuits, or other types of control circuits may be devised to control the charge transfer rates to achieve image motion compensation. In addition, many of the functions performed by the disclosed digital electronic control circuits can be implemented in software by the computer 34 or another data processor. As previously noted, alternative architectures for an electro-optical imaging array may be chosen. The present invention, as defined in the appended claims, is intended to cover all such modifications and alternative implementations.

What is claimed is:

1. An imaging system with two axis image motion compensation, said imaging system for installation aboard a vehicle capable of linear forward motion with respect to a scene external of said vehicle, said scene to be imaged by said systems, comprising:

an array of pixel elements arranged in rows and columns, said rows defining a row direction and said columns defining a column direction;

said pixel elements storing pixel information representing an image of said scene, said image having a motion with respect to said array of pixel elements, during exposure of the array to the scene, in an arbitrary combination of the row direction and the column direction, due to said linear forward motion of said imaging system and vehicle with respect to said scene as well as rotation of said imaging system and vehicle with respect to said scene;

a computer system, responsive to information from a vehicle navigation system as to said linear forward motion and rotation of said imaging system and vehicle with respect to said scene, for resolving said image motion into two orthogonal components, one component in said row direction and the other component in said column direction, said computer system further comprising a means for determining in advance of or during the exposure of said array to said scene the magnitude and direction of said image motion in said row and column directions with respect to said array of pixel elements; and means responsive to said computer system for transferring said pixel information in said array in said row direction and in said column direction during exposure of said array to a scene in substantial synchronism with said motion of said image in said row direction and in said column direction, the transferring of pixel information in said row direction and in said column direction in substantial synchronism with said motion of said image in said row direction and in said column direction enabling resolution of an image generated by said array to be preserved, said transferring of pixel information compensating for both said linear forward motion and rotation of said imaging system and vehicle with respect to said scene.

2. The array of claim 1, wherein said array of cells are organized in a plurality of cells of said pixel elements, wherein said pixel information in at least one of said cells is transferred uniformly in said row direction and in said column direction for each of said pixel elements in said cell.

3. The array of claim 1, wherein said array comprises a charge-coupled device.

4. The array of claim 1, 2, or 3, wherein said array is installed in an airborne vehicle.

5. The array of claim 1, wherein said array is installed in an airborne vehicle, said airborne vehicle having a system generating information as to roll, pitch and yaw of said airborne vehicle, and wherein said means for transferring comprises:

calculating means responsive to said generating system for calculating a rotation matrix for the rotation of said airborne vehicle and for calculating an image disparity vector for said pixels from said rotation matrix; and a line rate means responsive to said calculating means for determining pixel information transfer rates for said array in said row direction and in said column direction, said pixel information in said array transferred in said row direction and said column direction according to said pixel information transfer rates to thereby compensate for said image motion.

6. The array of claim 5, wherein said means for transferring further comprises:

a first set of counters and clock drives for transferring said pixel information in said array in said row direction; and a second set of counters and clock drives for transferring said pixel information in said array in said column direction.

7. An aerial reconnaissance camera system for installation in an airborne vehicle and for generating an image of a scene which compensates for aircraft motion in a flight direction and compensates for roll, pitch, or yaw disturbances of said airborne vehicle, said airborne vehicle having a means installed in said aircraft for generating aircraft disturbance information, the camera system comprising:

an array of pixel elements arranged in rows and columns storing pixel information representing said scene, said rows defining a row direction and said columns defining a column direction;

means responsive to said aircraft disturbance information generating means for generating an image disparity vector for said pixel elements in said row direction and in said column direction and for generating a row pixel information transfer rate and a column pixel information transfer rate;

a pixel transfer means for moving pixel information from one of said pixel elements to another of said pixels in said row direction and in said column direction, said pixel transfer means transferring said pixel information at said row and column pixel information transfer rates;

said row and column pixel information transfer rates comprising the sum of an in-line-of flight transfer rate compensating for forward motion of said airborne vehicle and an image disparity transfer rate derived from said image disparity vector compensating for at least one of said roll, pitch and yaw disturbances of said airborne vehicle.

8. The aerial reconnaissance camera system of claim 7, wherein said array comprises a charge-coupled device.

9. The aerial reconnaissance camera system of claim 7, wherein said array comprises a charge injection device.

10. The aerial reconnaissance camera of claim 7, wherein said array comprises an infrared array.

11. The aerial reconnaissance camera of claim 7, wherein said pixels of said array are organized in a plurality of cells, each cell comprising a group of pixels forming a rectangle of at least one pixel in said column direction and at least one pixel in said row direction, wherein said pixel information in at least one of said cells is transferred uniformly in said row direction and said column direction for each of said pixel elements in said cell;

and wherein said row and column pixel information transfer rates are calculated independently for each of said cells in said array.

12. The aerial reconnaissance camera system of claim 11, wherein said plurality of cells comprises at least eight cells.

13. The aerial reconnaissance camera of claim 12, wherein said plurality of cells comprises between 30 and 600 cells.

14. The aerial reconnaissance camera system of claim 7, wherein said row and column pixel information transfer rates correct for roll, pitch and yaw rotation of said airborne vehicle during a time period in which said array is exposed to said scene.

15. A machine-readable storage medium storing a computer program for an imaging system, said computer program comprising:

a routine for computing a rotation matrix R and a drift matrix $\Delta R$ from inputs comprising aerial reconnaissance vehicle roll, pitch, and yaw information;

a routine for computing an image disparity vector $d_T(\chi)$, where $d_T(\chi)$ comprises an image disparity for point $(\chi)$ of an imaging array comprised of pixels arranged in rows and columns defining a row direction and a column direction;

wherein $d_T(x) = \frac{-1}{P} \left( \frac{F[R + \Delta R]^T[y + vT]}{u_z^T[R + \Delta R]^T[y + vT]} + x \right)$ and F=focal length of a lens for said array
P=size of said pixels in said array
y=object points
v=forward velocity of said aerial reconnaissance vehicle
$\chi$=image points in said array
T=exposure time of said array; and a routine for calculating a pixel information transfer rate for said array from said image disparity vector in said row direction and in said column direction.

16. A method for electronically compensating for relative motion of an image of a scene with respect to an electro-optical imaging array, said array having a plurality of pixel elements storing pixel information arranged in rows and columns, said rows defining a row direction and said columns defining a column direction, said array installed in a moving vehicle, comprising the steps of:

determining the image motion rates in the plane of said imaging array in said row direction and in said column direction resulting from forward motion of said vehicle and angular rotations of said vehicle from information as to forward motion and rotation of said moving vehicle received from a navigation system aboard said moving vehicle, said step of determining performed in advance of or during an exposure of said array to said scene;

exposing said array to said scene; and transferring pixel information in said array in said row direction and said column direction at row direction rates and column direction rates during said exposure of said array to said scene substantially equal to said image motion rates to thereby compensate for said forward motion and angular rotation of said vehicle and preserve resolution of an image generated from said imaging array.

17. The method of claim 16, wherein said array is organized in a plurality of cells of pixel elements, and wherein said steps of determining and transferring are performed for each of said cells independently.

18. The method of claim 16, wherein said row direction transfer rate is proportional to $$u_c^T \times \frac{d_T(x)}{T}$$

and said column direction transfer rate is proportional to $$u_i^T \times \frac{d_T(x)}{T}$$

wherein $u_c^T$ is a transpose of a unit vector in said row direction and $u_i^T$ is a unit vector in said column direction, and $$\frac{d_T(x)}{T}$$

is an image disparity vector.

19. The method of claim 16, wherein said array comprises a charge-coupled device.

20. The method of claim 16, wherein said array comprises a charge injection device.

21. The method of claim 16, wherein said array comprises an infrared array.

22. The method of claim 16, wherein said pixels of said array are organized in a plurality of cells, each cell comprising a group of pixels forming a rectangle of at least one pixel in said column direction and at least one pixel in said row direction, wherein said pixel information in at least one of said cells is transferred uniformly in said row direction and in said column direction for each of said pixel elements in said cell;

and wherein said row and column transfer rates are calculated independently for each of said cells in said array.

23. The method of claim 22, wherein said plurality of cells comprises at least twenty cells.

24. The method of claim 23, wherein said plurality of cell comprises between 30 and 600 cells.

25. The method of claim 17, wherein said row and column transfer rates compensate for roll, pitch and yaw rotation of said airborne vehicle during a time period in which said array is exposed to said scene.

26. The imaging system of claim 1, wherein said array of pixel elements comprises a detector sensitive to radiation from said scene in the infra-red portion of the spectrum.

27. The imaging system of claim 1, wherein said array of pixel elements comprises a C-MOS detector.

28. The imaging system of claim 1, wherein said array of pixel elements comprises a detector sensitive to radiation from said scene in the ultraviolet portion of the spectrum.

* * * * *

UNITED STATES PATENT AND TRADEMARK OFFICE
Certificate

Patent No. 5,798,786                                          Patented: August 18, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Andre G. Lareau, Bloomingdale, IL; Brian James, Buffalo Grove, IL; William R. Pfister, Schaumburg, IL; Kenneth J. Jerkatis, Barrington, IL; Stephan R. Beran, Mount Prospect, IL; Russell A. Bennett, Mchenry, IL; and Gordon L. Bourns, Riverside, CA.

Signed and Sealed this Twenty-Eighth Day of December, 1999.

DOUGLAS W. OLMS
*Supervisory Patent Examiner*
Art Unit 2732